US012652416B2

(12) United States Patent
Koo et al.

(10) Patent No.: US 12,652,416 B2
(45) Date of Patent: *Jun. 9, 2026

(54) METHOD AND DEVICE FOR PROCESSING VIDEO SIGNAL USING REDUCED TRANSFORM

(71) Applicant: LG Electronics Inc., Seoul (KR)

(72) Inventors: Moonmo Koo, Seoul (KR); Seunghwan Kim, Seoul (KR); Mehdi Salehifar, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/941,358

(22) Filed: Nov. 8, 2024

(65) Prior Publication Data

US 2025/0142126 A1     May 1, 2025

Related U.S. Application Data

(63) Continuation of application No. 17/428,016, filed as application No. PCT/KR2020/001715 on Feb. 6, 2020, now Pat. No. 12,177,484.

(60) Provisional application No. 62/802,179, filed on Feb. 6, 2019.

(51) Int. Cl.
*H04N 19/625* (2014.01)
*H04N 19/119* (2014.01)
*H04N 19/12* (2014.01)
*H04N 19/157* (2014.01)
*H04N 19/176* (2014.01)

(52) U.S. Cl.
CPC ......... *H04N 19/625* (2014.11); *H04N 19/119* (2014.11); *H04N 19/12* (2014.11); *H04N 19/157* (2014.11); *H04N 19/176* (2014.11)

(58) Field of Classification Search
CPC .... H04N 19/625; H04N 19/119; H04N 19/12; H04N 19/157; H04N 19/176
USPC ...................................................... 375/240.02
See application file for complete search history.

(56) References Cited

U.S. PATENT DOCUMENTS 8,902,988 B2 * 12/2014 Sole Rojals ........... H04N 19/64
                                                              375/240.18
2020/0186838 A1 * 6/2020 Zhao .................... H04N 19/159

FOREIGN PATENT DOCUMENTS

| KR | 20170117112 | A | * | 10/2017 | ........... H04N 19/176 |
| KR | 20170134300 | A | * | 12/2017 | ........... H04N 19/176 |
| KR | 20180001485 | A | * | 1/2018 | ........... H04N 19/159 |
| KR | 20180059367 | A | * | 6/2018 | ........... H04N 19/119 |

* cited by examiner

*Primary Examiner* — William C Vaughn, Jr.
*Assistant Examiner* — Kristin Dobbs
(74) *Attorney, Agent, or Firm* — Fish & Richardson P.C.

(57) ABSTRACT

A method and device for processing a video signal using a reduced transform are provided. A method for decoding a video signal includes splitting a current block into a plurality of subblocks based on a first flag for a split direction of the current block, determining a subblock, to which a transform is applied, among the plurality of subblocks based on a second flag for a position of a transform target block, determining a transform target area in the subblock, and applying an inverse transform including a horizontal transform and a vertical transform to transform coefficients of the transform target area. The transform target area is determined based on a transform type applied to the subblock and a size of the subblock.

7 Claims, 23 Drawing Sheets

SBT-V, position 0
(w1 = 1/2 w)

SBT-V, position 1
(w1 = 1/2 w)

SBT-H, position 0
(h1 = 1/2 h)

SBT-H, position 1
(h1 = 1/2 h)

SBT-V, position 0
(w1 = 1/4 w)

SBT-V, position 1
(w1 = 3/4 w)

SBT-H, position 0
(h1 = 1/4 h)

SBT-H, position 1
(h1 = 3/4 h)

Start

Split current block into a plurality of subblocks —S2010

Determine subblock, to which transform is applied, among plurality of subblocks —S2020

Determine transform target area —S2030

Apply inverse transform —S2040

End

2100

2110

Processor

2120

Memory

METHOD AND DEVICE FOR PROCESSING VIDEO SIGNAL USING REDUCED TRANSFORM

CROSS-REFERENCE TO RELATED APPLICATIONS

This application is a continuation of U.S. application Ser. No. 17/428,016, filed on Aug. 3, 2021, which is a National Stage application under 35 U.S.C. § 371 of International Application No. PCT/KR2020/001715, filed on Feb. 6, 2020, which claims the benefit of U.S. Provisional Application No. 62/802,179, filed on Feb. 6, 2019. The disclosures of the prior applications are incorporated by reference in their entirety.

TECHNICAL FIELD

Embodiments of the present disclosure relate to a method and device for processing a video signal, and more particularly to a method and device for performing a transform on a per subblock basis.

BACKGROUND ART

Compression coding refers to a signal processing technique for transmitting digitalized information through a communication line or storing the same in an appropriate form in a storage medium. Media such as video, images and audio can be objects of compression coding and, particularly, a technique of performing compression coding on images is called video image compression.

Next-generation video content will have features of a high spatial resolution, a high frame rate and high dimensionality of scene representation. To process such content, memory storage, a memory access rate and processing power will significantly increase.

Accordingly, there is a need to design a coding tool for processing more efficiently next-generation video content. In particular, a scheme for efficiently performing a transform is required.

DISCLOSURE

Technical Problem

Embodiments of the present disclosure provide a method for performing a reduced transform in a process of encoding or decoding a video signal.

Technical objects to be achieved in embodiments of the present disclosure are not limited to the aforementioned technical objects, and other technical objects not described above may be evidently understood by a person having ordinary knowledge in the art to which the present disclosure pertains from the following description.

Technical Solution

A method for decoding a video signal according to an embodiment of the present disclosure comprises splitting a current block into a plurality of subblocks based on a first flag for a split direction of the current block, determining a subblock, to which a transform is applied, among the plurality of subblocks based on a second flag for a position of a transform target block, determining a transform target area in the subblock, and applying an inverse transform including a horizontal transform and a vertical transform to transform coefficients of the transform target area, wherein the transform target area is determined based on a transform type applied to the subblock and a size of the subblock.

In an embodiment, a width of the transform target area may be determined based on a type of the horizontal transform and a width of the subblock, and a height of the transform target area may be determined based on a type of the vertical transform and a height of the subblock.

In an embodiment, the type of the horizontal transform may correspond to discrete sine transform type 7 (DST-7) or discrete cosine transform type 8 (DCT-8). If the width of the subblock is greater than or equal to a first length, the width of the transform target area may be determined as a second length less than the first length. Further, the type of the vertical transform may correspond to DST-7 or DCT-8. If the height of the subblock is greater than or equal to the first length, the height of the transform target area may be determined as the second length less than the first length, In an embodiment, a remaining area excluding the transform target area from the subblock may be derived to be filled with zero.

In an embodiment, the first flag may indicate to split the current block into two transform units in a horizontal direction, or indicate to split the current block into two transform units in a vertical direction.

A method for encoding a video signal according to another embodiment of the present disclosure comprises splitting a current block including residual samples into a plurality of subblocks, determining a subblock to apply a transform from among the plurality of subblocks, generating a transform block including transform coefficients by applying a horizontal transform and a vertical transform to the subblock, and encoding information related to the transform, wherein an area in which a non-zero transform coefficient is present in the transform block is determined based on a transform type applied to the subblock and a size of the subblock, wherein the information related to the transform includes a first flag for a split direction of the current block and a second flag indicating the subblock to apply the transform from among the plurality of subblocks.

A decoding apparatus of a video signal according to another embodiment of the present disclosure comprises a memory configured to store the video signal, and a processor coupled to the memory and configured to process the video signal. The processor is configured to split a current block into a plurality of subblocks based on a first flag for a split direction of the current block, determine a subblock, to which a transform is applied, among the plurality of subblocks based on a second flag for a position of a transform target block, determine a transform target area in the subblock, and apply an inverse transform including a horizontal transform and a vertical transform to transform coefficients of the transform target area. The transform target area is determined based on a transform type applied to the subblock and a size of the subblock.

An encoding apparatus of a video signal according to another embodiment of the present disclosure comprises a memory configured to store the video signal, and a processor coupled to the memory and configured to process the video signal. The processor is configured to split a current block including residual samples into a plurality of subblocks, determine a subblock to apply a transform from among the plurality of subblocks, generate a transform block including transform coefficients by applying a horizontal transform and a vertical transform to the subblock, and encode information related to the transform, wherein an area in which a non-zero transform coefficient is present in the transform block is determined based on a transform type applied to the subblock and a size of the subblock, wherein the information related to the transform includes a first flag for a split direction of the current block and a second flag indicating the subblock to apply the transform from among the plurality of subblocks.

Another embodiment of the present disclosure provides a non-transitory computer-readable medium storing one or more commands. The one or more commands executed by one or more processors allow a decoding apparatus to split a current block into a plurality of subblocks based on a first flag for a split direction of the current block, determine a subblock, to which a transform is applied, among the plurality of subblocks based on a second flag for a position of a transform target block, determine a transform target area in the subblock, and apply an inverse transform including a horizontal transform and a vertical transform to transform coefficients of the transform target area, wherein the transform target area is determined based on a transform type applied to the subblock and a size of the subblock.

The one or more commands executed by one or more processors according to another embodiment of the present disclosure allow an encoding apparatus to split a current block including residual samples into a plurality of subblocks, determine a subblock to apply a transform from among the plurality of subblocks, generate a transform block including transform coefficients by applying a horizontal transform and a vertical transform to the subblock, and encode information related to the transform, wherein an area in which a non-zero transform coefficient is present in the transform block is determined based on a transform type applied to the subblock and a size of the subblock, wherein the information related to the transform includes a first flag for a split direction of the current block and a second flag indicating the subblock to apply the transform from among the plurality of subblocks.

Advantageous Effects

Embodiments of the present disclosure can reduce computational complexity generated in an inverse transform and reduce an overhead for signaling of transform coefficients by reducing a target of the inverse transform to a partial area in a transform block when performing the inverse transform on the transform block with a size greater than a predetermined size.

Effects that can achieved by embodiments of the present disclosure are not limited to effects that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the present disclosure.

FIG. 5a illustrates an example of a block split structure according to quadtree (QT), FIG. 5b illustrates an example of a block split structure according to binary tree (BT), FIG. 5c illustrates an example of a block split structure according to ternary tree (TT), and FIG. 5d illustrates an example of a block split structure according to asymmetric tree (AT).

FIG. 12a illustrates an area where a significant coefficient is present and an area where zero-out is applied upon forward transform, and FIG. 12b illustrates an area where a significant coefficient is present and an area where zero-out is applied upon inverse transform.

MODE FOR INVENTION

Some embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

Although most terms used in the present disclosure have been selected from general ones widely used in the art, some terms have been arbitrarily selected by the applicant and their meanings are explained in detail in the following description as needed. Thus, the present disclosure should be understood with the intended meanings of the terms rather than their simple names or meanings.

Specific terms used in the following description have been provided to help understanding of the present disclosure, and the use of such specific terms may be changed in various forms without departing from the technical sprit of the present disclosure. For example, signals, data, samples, pictures, frames, blocks and the like may be appropriately replaced and interpreted in each coding process.

In the present description, a "processing unit" refers to a unit in which an encoding/decoding process such as prediction, transform and/or quantization is performed. Further, the processing unit may be interpreted into the meaning including a unit for a luma component and a unit for a chroma component. For example, the processing unit may correspond to a block, a coding unit (CU), a prediction unit (PU) or a transform unit (TU).

In addition, the processing unit may be interpreted into a unit for a luma component or a unit for a chroma component. For example, the processing unit may correspond to a coding tree block (CTB), a coding block (CB), a PU or a transform block (TB) for the luma component. Further, the processing unit may correspond to a CTB, a CB, a PU or a TB for the chroma component. Moreover, the processing unit is not limited thereto and may be interpreted into the meaning including a unit for the luma component and a unit for the chroma component.

In addition, the processing unit is not necessarily limited to a square block and may be configured as a polygonal shape having three or more vertexes.

Furthermore, in the present description, a pixel is called a sample. In addition, using a sample may mean using a pixel value or the like.

Figure 1:
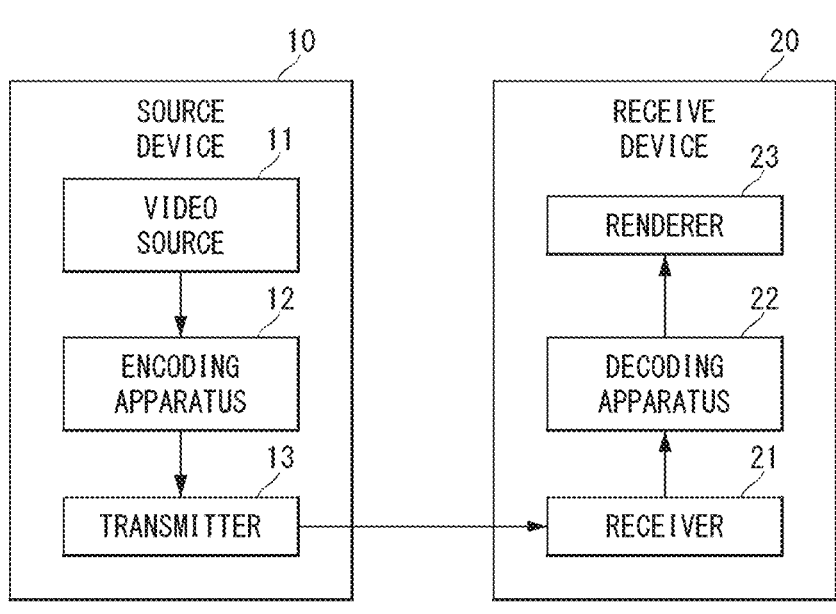
FIG. 1 illustrates an example of a video coding system according to an embodiment of the present disclosure.

FIG. 1 illustrates an example of a video coding system according to an embodiment of the present disclosure. The video coding system may include a source device 10 and a receive device 20. The source device 10 can transmit encoded video/image information or data to the receive device 20 in the form of a file or streaming through a digital storage medium or a network.

The source device 10 may include a video source 11, an encoding apparatus 12, and a transmitter 13. The receive device 20 may include a receiver, a decoding apparatus 22 and a renderer 23. The encoding apparatus 12 may be called a video/image encoding apparatus and the decoding apparatus 20 may be called a video/image decoding apparatus. The transmitter 13 may be included in the encoding apparatus 12. A receiver 21 may be included in the decoding apparatus 22. The renderer 23 may include a display and the display may be configured as a separate device or an external component.

The video source 11 may obtain a video/image through a process of capturing, combining or generating the video/image. The video source 11 may include a video/image capture device and/or a video/image generation device. The video/image capture device may include, for example, one or more cameras and a video/image archive including previously captured videos/images. The video/image generation device may include, for example, a computer, a tablet, and a smartphone and (electronically) generate a video/image. For example, a virtual video/image may be generated through a computer, and in this case, a video/image capture process may be replaced with a related data generation process.

The encoding apparatus 12 may encode an input video/image. The encoding apparatus 12 may perform a series of procedures, such as prediction, transform and quantization, for compression and coding efficiency. Encoded data (encoded video/image information) may be output in the form of a bitstream.

The transmitter 13 may transmit encoded video/image information or data output in the form of a bitstream to the receiver 21 of the receive device 20 in the form of file or streaming via a digital storage medium or a network. The digital storage medium may include various storage media such as a universal serial bus (USB), a secure digital (SD) card, a compact disc (CD), a digital versatile disc (DVD), a blue-ray disc, a hard disk drive (HDD), and a solid state drive (SSD). The transmitter 13 may include an element for generating a media file through a predetermined file format, and may include an element for transmission via a broadcast/communication network. The receiver 21 may extract a bitstream and transmit the bitstream to the decoding apparatus 22.

The decoding apparatus 22 may decode a video/image by performing a series of procedures such as dequantization, inverse transform and prediction corresponding to operation of the encoding apparatus 12.

The renderer 23 may render the decoded video/image. The rendered video/image may be display through a display.

Figure 2:
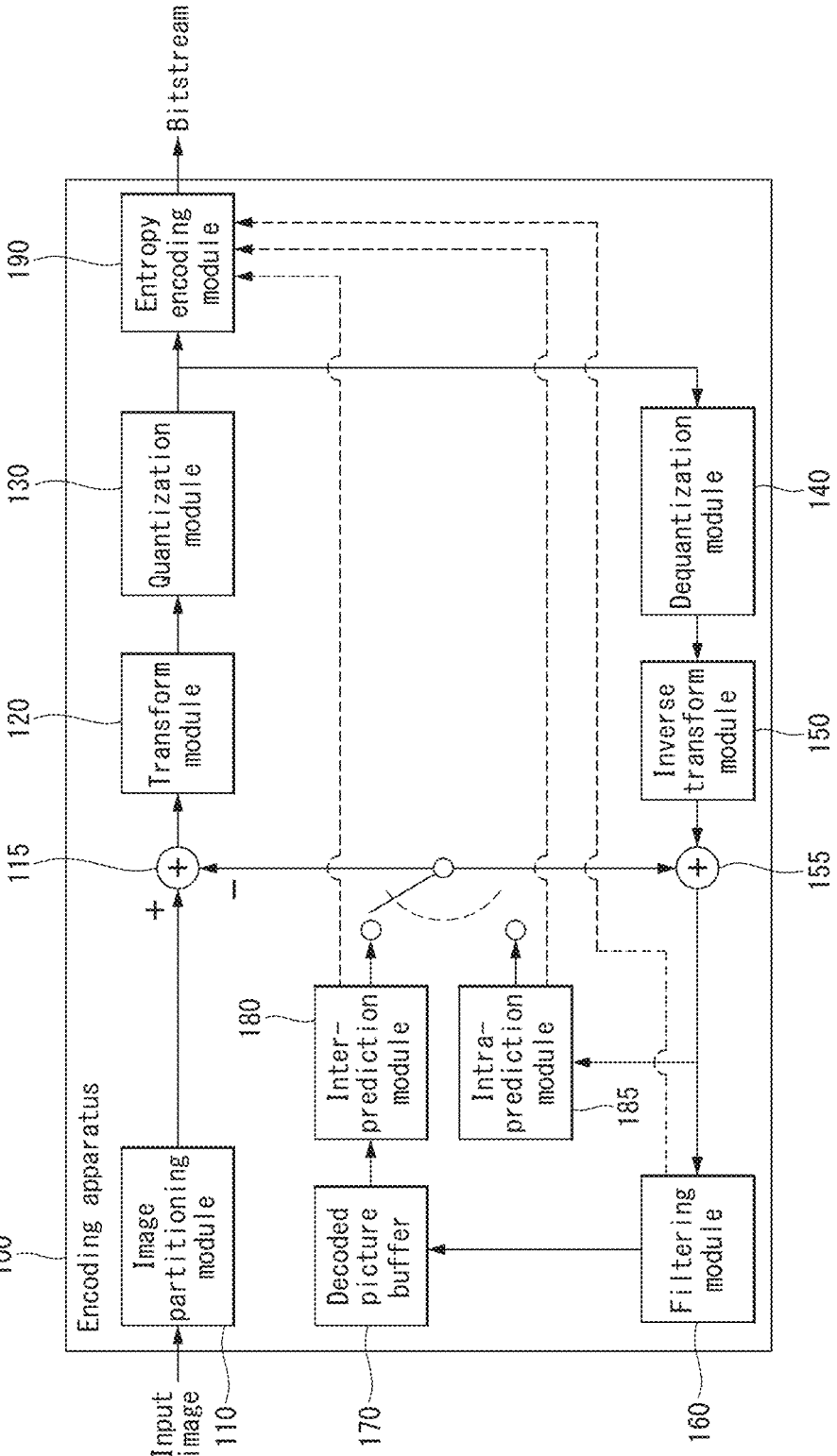
FIG. 2 illustrates a schematic block diagram of an encoding apparatus, for encoding a video signal, according to an embodiment of the present disclosure.

FIG. 2 illustrates a schematic block diagram of an encoding apparatus, for encoding a video signal. according to an embodiment of the present disclosure. An encoding apparatus 100 of FIG. 2 may correspond to the encoding apparatus 12 of FIG. 1.

An image partitioning module 110 may partition an input image (or a picture or a frame) input to the encoding apparatus 100 into one or more processing units. For example, the processing unit may be called a coding unit (CU). In this case, the coding unit may be recursively partitioned from a coding tree unit (CTU) or a largest coding unit (LCU) according to a quad-tree binary-tree (QTBT) structure. For example, one coding unit may be partitioned into a plurality of coding units with a deeper depth based on the quad-tree structure and/or the binary tree structure. In this case, for example, the quad-tree structure may be first applied, and then the binary tree structure may be applied. Alternatively, the binary tree structure may be first applied. A coding procedure according to an embodiment of the present disclosure may be performed based on a final coding unit that is no longer partitioned. In this case, a largest coding unit may be directly used as the final coding unit based on coding efficiency according to image characteristics. Alternatively, the coding unit may be recursively partitioned into coding units with a deeper depth, and thus a coding unit with an optimal size may be used as the final coding unit, if necessary or desired. Here, the coding procedure may include procedures such as prediction, transform and reconstruction which will be described later. As another example, the processing unit may further include a prediction unit (PU) or a transform unit (TU). In this case, the prediction unit and the transform unit may be partitioned from the above-described coding unit. The prediction unit may be a unit of sample prediction, and the transform unit may be a unit of deriving a transform coefficient or a unit of deriving a residual signal from a transform coefficient.

The term 'unit' used in the present disclosure may be interchangeably used with the term 'block' or 'area', if necessary or desired. In the present disclosure, an M×N block may represent a set of samples or transform coefficients consisting of M columns and N rows. A sample may generally represent a pixel or a pixel value, and may represent a pixel/pixel value of a luma component or represent a pixel/pixel value of a chroma component. The sample may be used as a term for corresponding one picture (or image) to a pixel or a pel.

The encoding apparatus 100 may subtract a predicted signal (a predicted block or a predicted sample array) output from an inter-prediction module 180 or an intra-prediction module 185 from an input video signal (an original block or an original sample array) to generate a residual signal (a residual block or a residual sample array). The generated residual signal may be transmitted to the transform module 120. In this case, as shown, a unit which subtracts the predicted signal (predicted block or predicted sample array) from the input video signal (original block or original sample array) in the encoding apparatus 100 may be called a subtraction module 115. A prediction module may perform prediction on a processing target block (hereinafter, referred to as a current block) and generate a predicted block including predicted samples for the current block. The prediction module may determine whether to apply intra-prediction or inter-prediction on a per CU basis. The prediction module may generate various types of information on prediction, such as prediction mode information, and transmit the information on prediction to an entropy encoding module 190 as described later in description of each prediction mode. The information on prediction may be encoded in the entropy encoding module 190 and output in the form of a bitstream.

The intra-prediction module 185 may predict the current block with reference to samples in a current picture. Referred samples may neighbor the current block or may be separated therefrom according to a prediction mode. In intra-prediction, prediction modes may include a plurality of nondirectional modes and a plurality of directional modes. The nondirectional modes may include, for example, a DC mode and a planar mode. The directional modes may include, for example, 33 directional prediction modes or 65 directional prediction modes according to a degree of minuteness of prediction direction. However, this is merely an example, and a number of directional prediction modes equal to or greater than 65 or equal to or less than 33 may be used according to settings. The intra-prediction module 185 may determine a prediction mode to be applied to the current block using a prediction mode applied to neighbor blocks.

The inter-prediction module 180 may derive a predicted block for the current block based on a reference block (reference sample array) specified by a motion vector on a reference picture. To reduce an amount of motion information transmitted in an inter-prediction mode, the inter-prediction module 180 may predict motion information based on correlation of motion information between a neighboring block and the current block on a per block, subblock or sample basis. The motion information may include a motion vector and a reference picture index. The motion information may further include inter-prediction direction (L0 prediction, L1 prediction, Bi prediction, etc.) information. In the case of inter-prediction, neighboring blocks may include a spatial neighboring block present in a current picture and a temporal neighboring block present in a reference picture. The reference picture including the reference block may be the same as or different from the reference picture including the temporal neighboring block. The temporal neighboring block may be called a collocated reference block or a collocated CU (colCU), and the reference picture including the temporal neighboring block may be called a collocated picture (colPic). For example, the inter-prediction module 180 may construct a motion information candidate list based on motion information of neighboring blocks and generate information indicating which candidate is used to derive a motion vector and/or a reference picture index of the current block. The inter-prediction may be performed based on various prediction modes. For example, in the case of a skip mode and a merge mode, the inter-prediction module 180 may use motion information of a neighboring block as motion information of the current block. In the skip mode, a residual signal is not be transmitted, unlike the merge mode. In a motion vector prediction (MVP) mode, the motion vector of the current block may be indicated by using a motion vector of a neighboring block as a motion vector predictor and signaling a motion vector difference (MVD).

A predicted signal generated by the inter-prediction module 180 or the intra-prediction module 185 may be used to generate a reconstructed signal or a residual signal.

The transform module 120 may apply a transform technique to a residual signal to generate transform coefficients. For example, the transform technique may include at least one of discrete cosine transform (DCT), discrete sine transform (DST), Karhunen-Loeve transform (KLT), graph-based transform (GBT), and conditionally non-linear transform (CNT). The GBT refers to transform obtained from a graph representing information on a relationship between pixels. The CNT refers to transform obtained based on a predicted signal generated using all previously reconstructed pixels. Further, the transform process may be applied to square pixel blocks with the same size, or applied to non-square blocks or blocks with variable sizes.

A quantization module 130 may quantize transform coefficients and transmit the quantized transform coefficients to the entropy encoding module 190. The entropy encoding module 190 may encode a quantized signal (information on the quantized transform coefficients) and output the encoded signal as a bitstream. The information on the quantized transform coefficients may be called residual information. The quantization module 130 may rearrange the quantized transform coefficients of the block form in the form of one-dimensional (1D) vector based on a coefficient scan order and generate information about the quantized transform coefficients based on characteristics of the quantized transform coefficients of the one-dimensional vector form. The entropy encoding module 190 may perform various encoding schemes such as exponential Golomb, context-adaptive variable length coding (CAVLC), and context-adaptive binary arithmetic coding (CABAC). The entropy encoding module 190 may encode information necessary for video/image reconstruction (e.g., values of syntax elements) along with or separately from the quantized transform coefficients. Encoded information (e.g., video/image information) may be transmitted or stored in the form of a bitstream in network abstraction layer (NAL) unit. The bitstream may be transmitted through a network or stored in a digital storage medium. Here, the network may include a broadcast network and/or a communication network, and the digital storage medium may include various storage media such as USB, SD, CD, DVD, Blueray, HDD and SSD. A transmitter (not shown) which transmits the signal output from the entropy encoding module 190 and/or a storage (not shown) which stores the signal may be configured as internal/external elements of the encoding apparatus 100, or the transmitter may be a component of the entropy encoding module 190.

The quantized transform coefficients output from the quantization module 130 may be used to generate a reconstructed signal. For example, a residual signal can be reconstructed by applying dequantization and inverse transform to the quantized transform coefficients through a dequantization module 140 and an inverse transform module 150 in the loop. An addition module 155 may add the reconstructed residual signal to the predicted signal output from the inter-prediction module 180 or the intra-prediction module 185 to generate a reconstructed signal (reconstructed picture, reconstructed block or reconstructed sample array). When there is no residual signal for a processing target block as in a case in which the skip mode is applied, a predicted block may be used as a reconstructed block. The addition module 155 may also be called a reconstruction unit or a reconstructed block generator. The generated reconstructed signal can be used for intra-prediction of the next processing target block in the current picture or used for inter-prediction of the next picture through filtering which will be described later.

A filtering module 160 can improve subjective/objective picture quality by applying filtering to the reconstructed signal. For example, the filtering module 160 may generate a modified reconstructed picture by applying various filtering methods to the reconstructed picture and transmit the modified reconstructed picture to a decoded picture buffer (DBP) 170. Examples of the various filtering methods may include deblocking filtering, sample adaptive offset (SAO), adaptive loop filtering (ALF), and bilateral filtering. The filtering module 160 may generate information on filtering and transmit the information on filtering to the entropy encoding module 190 as will be described later in description of each filtering method. The information on filtering may be output in the form of a bitstream through entropy encoding in the entropy encoding module 190.

The modified reconstructed picture transmitted to the decoded picture buffer 170 may be used as a reference picture in the inter-prediction module 180. When inter-prediction is applied, the encoding apparatus 100 can avoid mismatch between the encoding apparatus 100 and the decoding apparatus 200 using the modified reconstructed picture and improve encoding efficiency. The decoded picture buffer 170 may store the modified reconstructed picture such that the modified reconstructed picture is used as a reference picture in the inter-prediction module 180.

Figure 3:
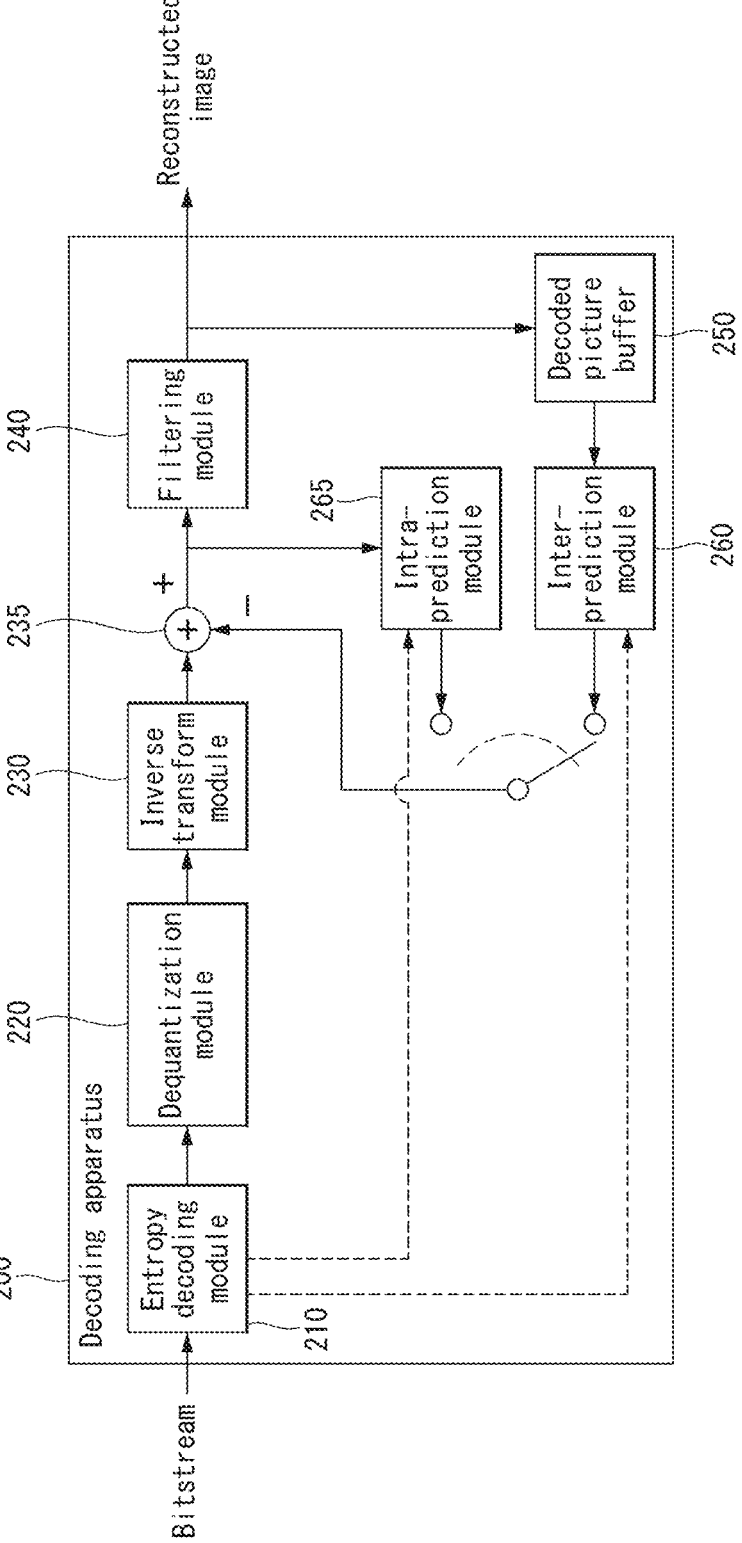
FIG. 3 illustrates a schematic block diagram of a decoding apparatus, for decoding a video signal, according to an embodiment of the present disclosure.

FIG. 3 is a schematic block diagram of a decoding apparatus which performs decoding of a video signal according to an embodiment of the present disclosure. The decoding apparatus 200 of FIG. 3 corresponds to the decoding apparatus 22 of FIG. 1.

Referring to FIG. 3, the decoding apparatus 200 may include an entropy decoding module 210, a dequantization module 220, an inverse transform module 230, an addition module 235, a filtering module 240, a decoded picture buffer (DPB) 250, an inter-prediction module 260, and an intra-prediction module 265. The inter-prediction module 260 and the intra-prediction module 265 may be collectively called a prediction module. That is, the prediction module may include the inter-prediction module 180 and the intra-prediction module 185. The dequantization module 220 and the inverse transform module 230 may be collectively called a residual processing module. That is, the residual processing module may include the dequantization module 220 and the inverse transform module 230. In some embodiments, the entropy decoding module 210, the dequantization module 220, the inverse transform module 230, the addition module 235, the filtering module 240, the inter-prediction module 260, and the intra-prediction module 265 described above may be configured as a single hardware component (e.g., a decoder or a processor). In some embodiments, the decoded picture buffer 250 may be configured as a single hardware component (e.g., a memory or a digital storage medium).

When a bitstream including video/image information is input, the decoding apparatus 200 may reconstruct an image through a process corresponding to the process of processing the video/image information in the encoding apparatus 100 of FIG. 2. For example, the decoding apparatus 200 may perform decoding using a processing unit applied in the encoding apparatus 100. Thus, a processing unit upon the decoding may be a coding unit, for example, and the coding unit may be partitioned from a coding tree unit or a largest coding unit according to a quadtree structure and/or a binary tree structure. In addition, a reconstructed video signal decoded and output by the decoding apparatus 200 may be reproduced through a reproduction apparatus.

The decoding apparatus 200 may receive a signal output from the encoding apparatus 100 of FIG. 2 in the form of a bitstream, and the received signal may be decoded through the entropy decoding module 210. For example, the entropy decoding module 210 may parse the bitstream to derive information (e.g., video/image information) necessary for image reconstruction (or picture reconstruction). For example, the entropy decoding module 210 may obtain information in the bitstream using a coding scheme such as exponential Golomb, CAVLC or CABAC, and output a syntax element value necessary for image reconstruction and a quantized value of transform coefficients for residual. More specifically, the CABAC entropy decoding method may receive a bin corresponding to each syntax element in the bitstream, determine a context model using decoding target syntax element information and decoding information of neighboring and decoding target blocks or information on symbols/bins decoded in a previous stage, predict the probability of generation of the bin according to the determined context model, and perform arithmetic decoding of bins to thereby generate a symbol corresponding to each syntax element value. The CABAC entropy decoding method can update the context model using information on symbols/bins decoded for the next symbol/bin context model after the context model is determined. Information about prediction among the information decoded in the entropy decoding module 210 may be provided to the prediction module (the inter-prediction module 260 and the intra-prediction module 265), and residual values, on which entropy decoding has been performed in the entropy decoding module 210, that is, quantized transform coefficients and related parameter information may be input to the dequantization module 220. Further, information on filtering among the information decoded in the entropy decoding module 210 may be provided to the filtering module 240. A receiver (not shown) receiving a signal output from the encoding apparatus 100 may be additionally configured as an internal/external element of the decoding apparatus 200, or the receiver may be a component of the entropy decoding module 210.

The dequantization module 220 may output transform coefficients through dequantization of the quantized transform coefficients. The dequantization module 220 may rearrange the quantized transform coefficients in the form of a two-dimensional (2D) block. In this case, rearrangement may be performed based on the coefficient scan order performed in the encoding apparatus 100. The dequantization module 220 may perform dequantization on the quantized transform coefficients using a quantization parameter (e.g., quantization step size information) and obtain transform coefficients.

The inverse transform module 230 inversely transforms the transform coefficients to obtain a residual signal (residual block or residual sample array). In the present disclosure, terms related to the (inverse) transform performed by the decoding apparatus 200 can be expressed as 'transform' for simplification of terminology. For example, since a transform target area is an inverse transform target area, horizontal/vertical transform may be replaced by horizontal/vertical inverse transform.

The prediction module may perform prediction on a current block and generate a predicted block including predicted samples for the current block. The prediction module may determine whether intra-prediction or inter-prediction is applied to the current block based on information on prediction output from the entropy decoding module 210, and determine a specific intra/inter-prediction mode.

The intra-prediction module 265 may predict the current block with reference to samples in a current picture. The referred samples may neighbor the current block or may be separated from the current block according to a prediction mode. In intra-prediction, prediction modes may include a plurality of nondirectional modes and a plurality of directional modes. The intra-prediction 265 may determine a prediction mode applied to the current block using a prediction mode applied to neighboring blocks.

The inter-prediction module 260 may derive a predicted block for the current block based on a reference block (reference sample array) specified by a motion vector on a reference picture. To reduce an amount of motion information transmitted in the inter-prediction mode, the motion information may be predicted based on correlation of motion information between a neighboring block and the current block on a per block, subblock or sample basis. The motion information may include a motion vector and a reference picture index. The motion information may further include inter-prediction direction (L0 prediction, L1 prediction, Bi prediction) information. In the case of inter-prediction, the neighboring blocks may include a spatial neighboring block present in a current picture and a temporal neighboring block present in a reference picture. For example, the inter-prediction module 260 may construct a motion information candidate list based on neighboring blocks and derive the motion vector and/or the reference picture index of the current block based on received candidate selection information. The inter-prediction may be performed based on various prediction modes, and information on prediction may include information indicating the inter-prediction mode for the current block.

The addition module 235 can generate a reconstructed signal (reconstructed picture, reconstructed block or reconstructed sample array) by adding the obtained residual signal to the predicted signal (predicted block or predicted sample array) output from the inter-prediction module 260 or the intra-prediction module 265. When there is no residual for the processing target block as in a case in which the skip mode is applied, the predicted block may be used as a reconstructed block.

The addition module 235 may also be called a reconstruction unit or a reconstructed block generator. The generated reconstructed signal may be used for intra-prediction of a next processing target block in the current picture or used for inter-prediction of a next picture through filtering which will be described later.

The filtering module 240 can improve subjective/objective picture quality by applying filtering to the reconstructed signal. For example, the filtering module 240 may generate a modified reconstructed picture by applying various filtering methods to the reconstructed picture, and transmit the modified reconstructed picture to a decoded picture buffer 250. Examples of the various filtering methods may include deblocking filtering, sample adaptive offset, adaptive loop filtering, and bilateral filtering.

The modified reconstructed picture transmitted to the decoded picture buffer 250 may be used as a reference picture by the inter-prediction module 260.

In the present disclosure, implementations described in the filtering module 160, the inter-prediction module 180, and the intra-prediction module 185 of the encoding apparatus 100 can be applied to the filtering module 240, the inter-prediction module 260 and the intra-prediction module 265 of the decoding apparatus equally or in a corresponding manner.

Figure 4:
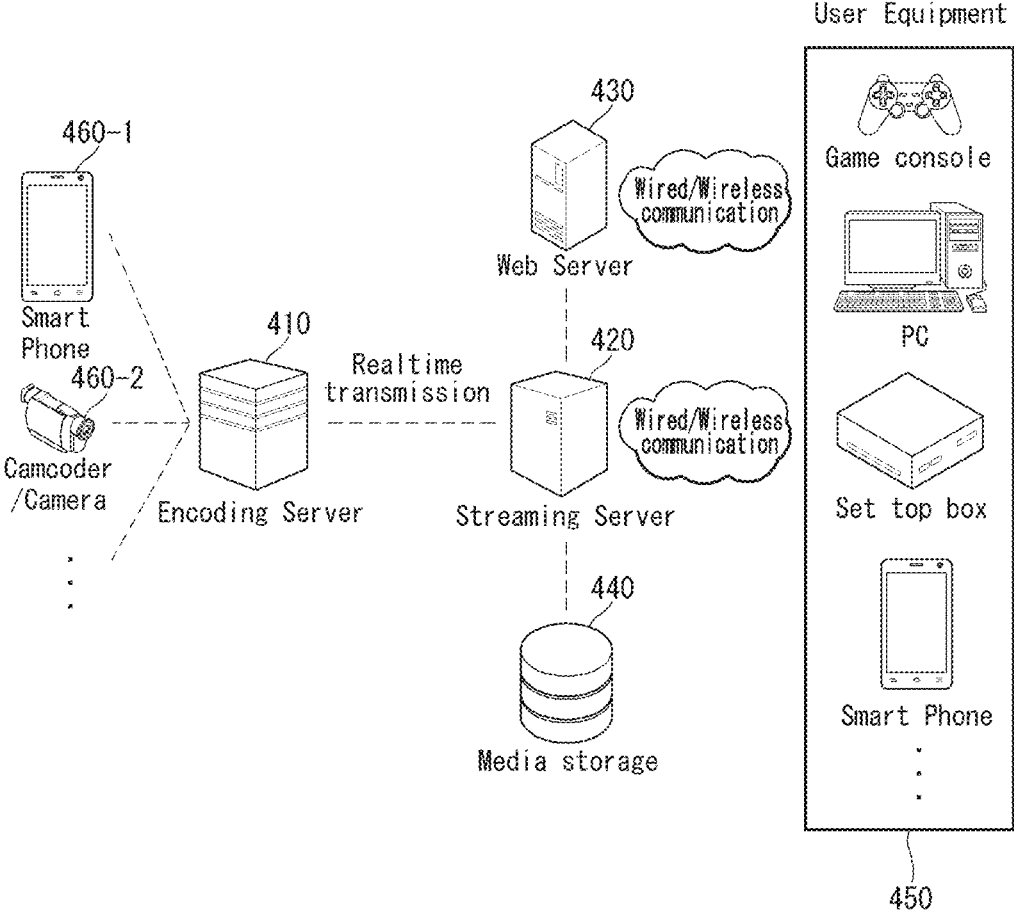
FIG. 4 illustrates a structure of a content streaming system according to an embodiment of the present disclosure.

FIG. 4 is a configuration diagram of a content streaming system according to an embodiment of the present disclosure.

A content streaming system to which an embodiment of the present disclosure is applied may roughly include an encoding server 410, a streaming server 420, a web server 430, a media storage 440, a user equipment 450, and a multimedia input device 460.

The encoding server 410 compresses content input from a multimedia input device 460 such as a smartphone, a camera, and a camcorder into digital data to generate a bitstream, and transmits the generated bitstream to the streaming server 420. As another example, when the multimedia input device 460 such as a smartphone, a camera and a camcorder directly generates the bitstream, the encoding server 410 may be omitted.

The bitstream may be generated by an encoding method or a bitstream generation method to which an embodiment of the present disclosure is applied, and the streaming server 420 may temporarily store the bitstream in the process of transmitting or receiving the bitstream.

The streaming server 420 transmits multimedia data to the user equipment 450 based on a user request via the web server 430, and the web server 430 serves as a medium that informs a user of types of services. If the user sends a request for a desired service to the web server 430, the web server 430 sends information on the requested service to the streaming server 420, and the streaming server 420 transmits multimedia data to the user. The content streaming system may include a separate control server, and in this case, the control server serves to control commands/responses between the respective devices in the content streaming system.

The streaming server 420 may receive content from the media storage 440 and/or the encoding server 410. For example, if content is received from the encoding server 410, the streaming server 420 may receive the content in real time. In this case, the streaming server 420 may store a bitstream for a predetermined time in order to provide a smooth streaming service.

Examples of the user equipment 450 may include a cellular phone, a smartphone, a laptop computer, a digital broadcast terminal, a personal digital assistant (PDA), a portable multimedia player (PMP), a navigation, a slate PC, a tablet PC, an ultrabook, a wearable device (e.g., a smartwatch, a smart glass, and a head mounted display (HMD)), a digital TV, a desktop computer, and a digital signage.

Each server in the content streaming system may be operated as a distributed server, and in this case, data received by each server may be distributed and processed.

Figures 5A, 5B:
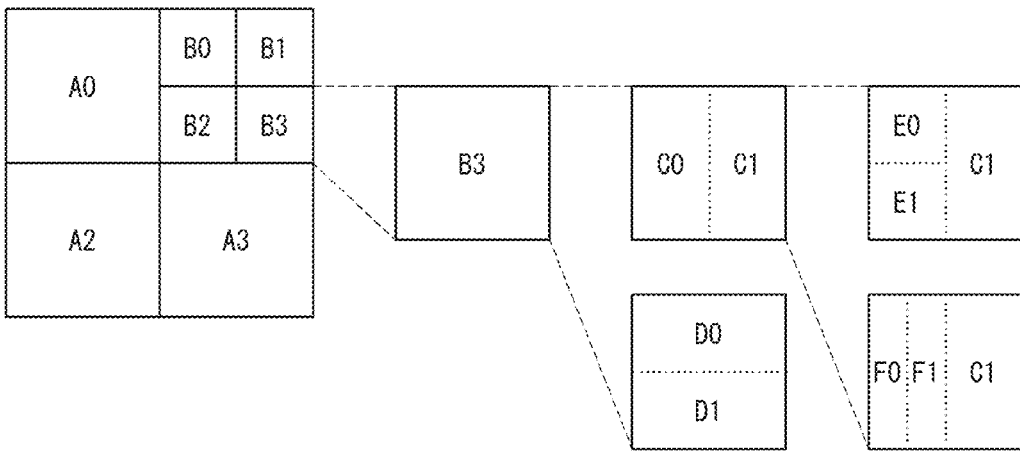
FIG. 5a to 5d illustrate examples of a block split structure according to an embodiment of the present disclosure, and more particularly.
Figure 5C:
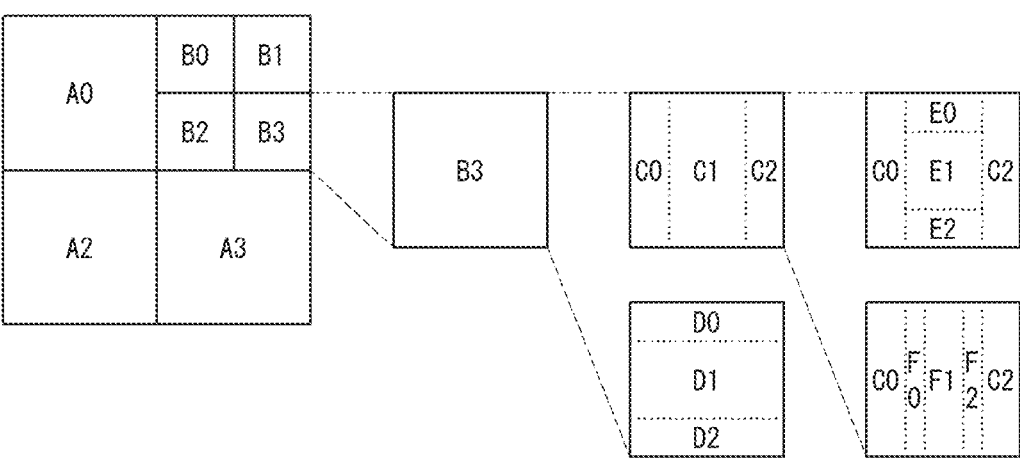
Figure 5D:
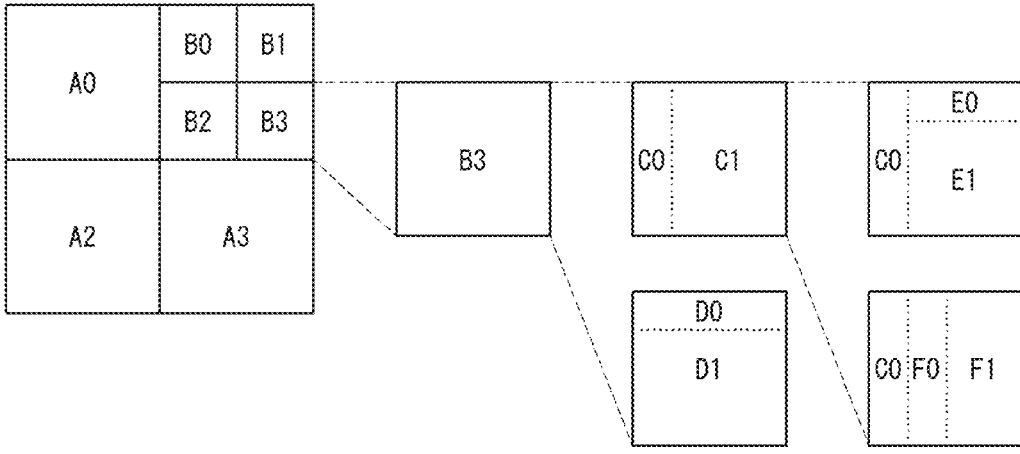

FIG. 5a to 5d illustrate examples of a block split structure according to an embodiment of the present disclosure. More particularly, FIG. 5a illustrates an example of a block split structure according to quadtree (QT), FIG. 5b illustrates an example of a block split structure according to binary tree (BT), FIG. 5c illustrates an example of a block split structure according to ternary tree (TT), and FIG. 5d illustrates an example of a block split structure according to asymmetric tree (AT).

In the video coding system, one block may be partitioned based on a QT partitioning scheme. One subblock partitioned using the QT partitioning scheme may be further recursively partitioned according to the QT partitioning scheme. A leaf block that is no longer partitioned by the QT partitioning scheme may be partitioned using at least one of BT, TT, or AT partitioning scheme. BT may have two types of partitions such as horizontal BT (2N×N, 2N×N) and vertical BT (N×2N, N×2N). TT may have two types of partitions such as horizontal TT (2N×1/2N, 2N×N, 2N×1/2N) and vertical TT (1/2N×2N, N×2N, 1/2N×2N). AT may have four types of partitions such as horizontal-up AT (2N×1/2N, 2N×3/2N), horizontal-down AT (2N×3/2N, 2N×1/2N), vertical-left AT (1/2N×2N, 3/2N×2N), and vertical-right AT (3/2N×2N, 1/2N×2N). Each of BT, TT and AT may be further recursively partitioned using BT, TT and AT.

FIG. 5a illustrates an example of QT partition. A block A may be partitioned into four subblocks A0, A1, A2 and A3 by QT. The subblock A1 may be further partitioned into four subblocks B0, B1, B2 and B3 by QT.

FIG. 5b illustrates an example of BT partition. The block B3 that is no longer partitioned by QT may be partitioned by vertical BT (C0, C1) or horizontal BT (D0, D1). Each subblock such as the block C0 may be further recursively partitioned as in the form of horizontal BT (E0, E1) or vertical BT (F0, F1).

FIG. 5c illustrates an example of TT partition. The block B3 that is no longer partitioned by QT may be partitioned into vertical TT (C0, C1, C2) or horizontal TT (D0, D1, D2).

Each subblock such as the block C1 may be further recursively partitioned as in the form of horizontal TT (E0, E1, E2) or vertical TT (F0, F1, F2).

FIG. 5d illustrates an example of AT partition. The block B3 that is no longer partitioned by QT may be partitioned into vertical AT (C0, C1) or horizontal AT (D0, D1). Each subblock such as the block C1 may be further recursively partitioned as in the form of horizontal AT (E0, E1) or vertical TT (F0, F1).

BT, TT and AT partitions may be applied to one block together. For example, a subblock partitioned by BT may be partitioned by TT or AT. Further, a subblock partitioned by TT may be partitioned by BT or AT. A subblock partitioned by AT may be partitioned by BT or TT. For example, after horizontal BT partition, each subblock may be partitioned by vertical BT. After vertical BT partition, each subblock may also be partitioned by horizontal BT. In this case, partition orders are different, but finally partitioned shapes are the same.

If a block is partitioned, a block search order may be variously defined. In general, search is performed from left to right and from top to bottom, and searching the block may mean the order of determining whether each partitioned subblock is additionally partitioned, or mean an encoding order of each subblock when the block is no longer partitioned, or mean a search order when a subblock refers to information of other neighboring block.

The transform may be performed per processing unit (or transform block) partitioned by the partition structures as illustrated in FIGS. 5a to 5d, and in particular, a transform matrix may be applied by performing the partition in a row direction and a column direction. According to an embodiment of the present disclosure, different transform types may be used depending on a length of the processing unit (or transform block) in the row direction or the column direction.

The transform is applied to residual blocks, and this is to decorrelate the residual blocks as much as possible, concentrate coefficients at a low frequency, and generate a zero tail at an end of a block. A transform scheme according to an embodiment of the present disclosure may include two stage of transforms (primary transform and secondary transform). The primary transform (or core transform) may be composed of DCT or DST transform families applied to all rows and columns of a residual block. Thereafter, the secondary transform may be additionally applied to a top left corner of an output of the core transform. Similarly, an inverse transform may be applied in the order of an inverse secondary transform and an inverse core transform. The inverse secondary transform may be first applied to a top left corner of a coefficient block. Then, the inverse core transform may be applied to the output of the inverse secondary transform.

Figure 6:
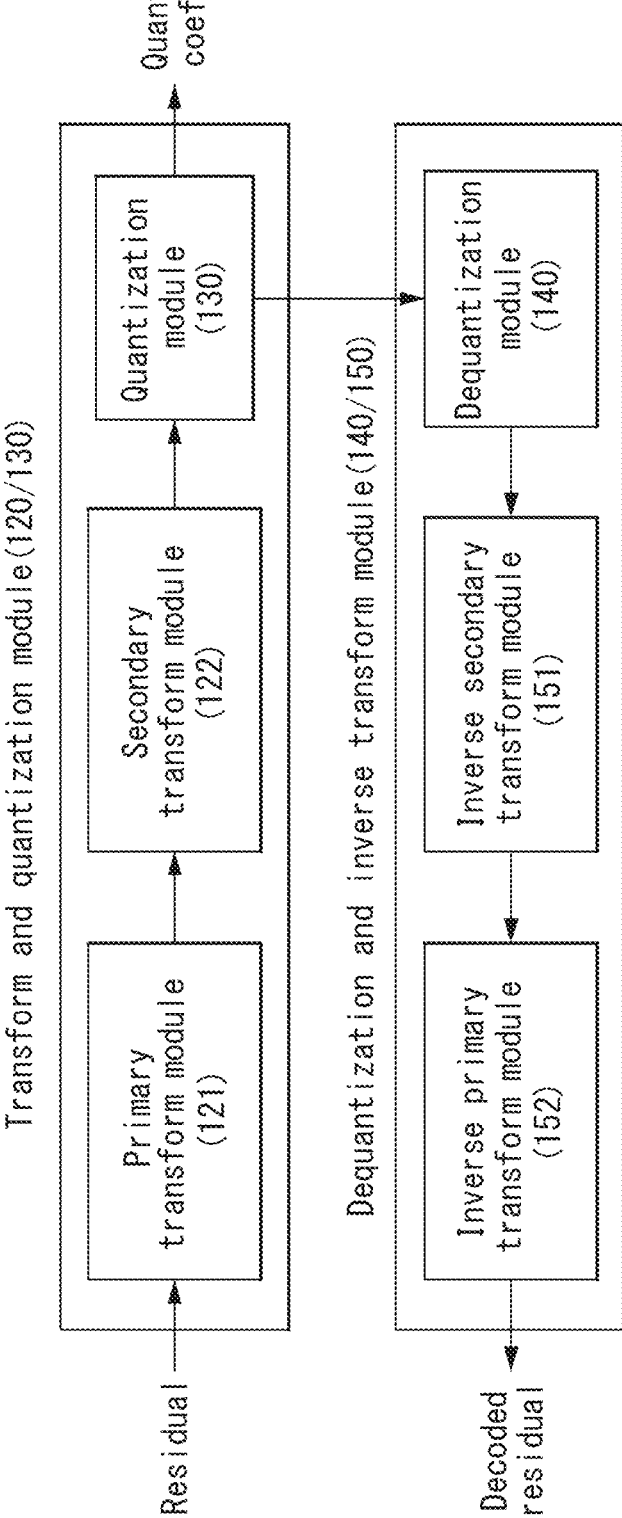
FIG. 6 illustrates an example of a schematic block diagram of a transform and quantization unit and a dequantization and inverse transform unit in an encoding apparatus according to an embodiment of the present disclosure.
Figure 7:
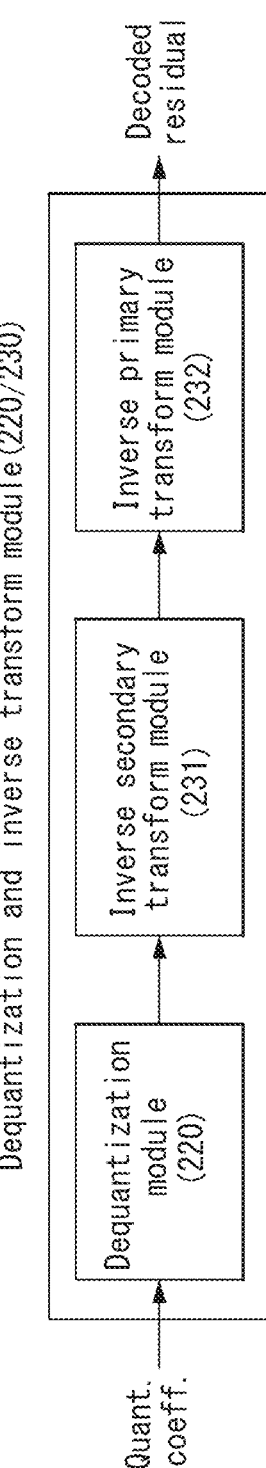
FIG. 7 illustrates a schematic block diagram of a dequantization and inverse transform unit in a decoding apparatus according to an embodiment of the present disclosure.

FIG. 6 is a schematic block diagram of the transform and quantization module 120/130 and the dequantization and inverse transform module 140/150 in the encoding apparatus 100 illustrated in FIG. 2, and FIG. 7 is a schematic block diagram of the dequantization and inverse transform module 220/230 in the decoding apparatus 200.

Referring to FIG. 6, the transform and quantization module 120/130 may include a primary transform module 121, a secondary transform module 122, and a quantization module 130. The dequantization and inverse transform module 140/150 may include a dequantization module 140, an inverse secondary transform module 151, and an inverse primary transform module 152.

Referring to FIG. 7, the dequantization and inverse transform module 220/230 may include a dequantization module 220, an inverse secondary transform module 231, and an inverse primary transform module 232. According to an embodiment of the present disclosure, a transform may be performed through a plurality of stages. For example, as illustrated in FIG. 6, two states of a primary transform a secondary transform may be applied, or more than two transform stages may be used according to algorithms. As described above, the primary transform may be referred to as a core transform.

The primary transform module 121 may apply the primary transform to a residual signal, and the primary transform may be predefined as a table in an encoder and/or a decoder. The secondary transform module 122 may apply the secondary transform to a primarily transformed signal, and the secondary transform may be predefined as a table in the encoder and/or the decoder.

In an embodiment, a non-separable transform may be conditionally applied as the secondary transform. For example, the secondary transform may be applied only to the case of intra-prediction blocks, and may have an applicable transform set for each prediction mode group.

The prediction mode group may be set based on symmetry with respect to a prediction direction. For example, since prediction mode 52 and prediction mode 16 are symmetrical based on prediction mode 34 (diagonal direction), one group may be formed and the same transform set may be applied thereto. When transform for prediction mode 52 is applied, transposed input data is applied, and this is because a transform set of prediction mode 52 is the same as that of prediction mode 16.

In the planar mode and the DC mode, since there is no symmetry with respect to the direction, a different transform set is applied, and a corresponding transform set may include two transforms. Each transform set may include three transforms in remaining directional modes.

The quantization module 130 may perform quantization on a secondarily transformed signal. The dequantization and inverse transform module 140/150 performs the reverse of the aforementioned procedure, and redundant description is omitted.

FIG. 7 is a schematic block diagram of the dequantization and inverse transform module 220/230 in the decoding apparatus 200. Referring to FIG. 7, the dequantization and inverse transform module 220/230 may include the dequantization module 220, the inverse secondary transform module 231, and the inverse primary transform module 232.

The dequantization module 220 obtains transform coefficients from an entropy-decoded signal using quantization step size information. The inverse secondary transform module 231 performs an inverse secondary transform on the transform coefficients. Here, the inverse secondary transform refers to an inverse transform of the secondary transform described with reference to FIG. 6. The inverse primary transform module 232 performs an inverse primary transform on the inversely secondarily transformed signal (or block) and obtains a residual signal. Here, the inverse primary transform refers to an inverse transform of the primary transform described with reference to FIG. 6.

Figure 8:
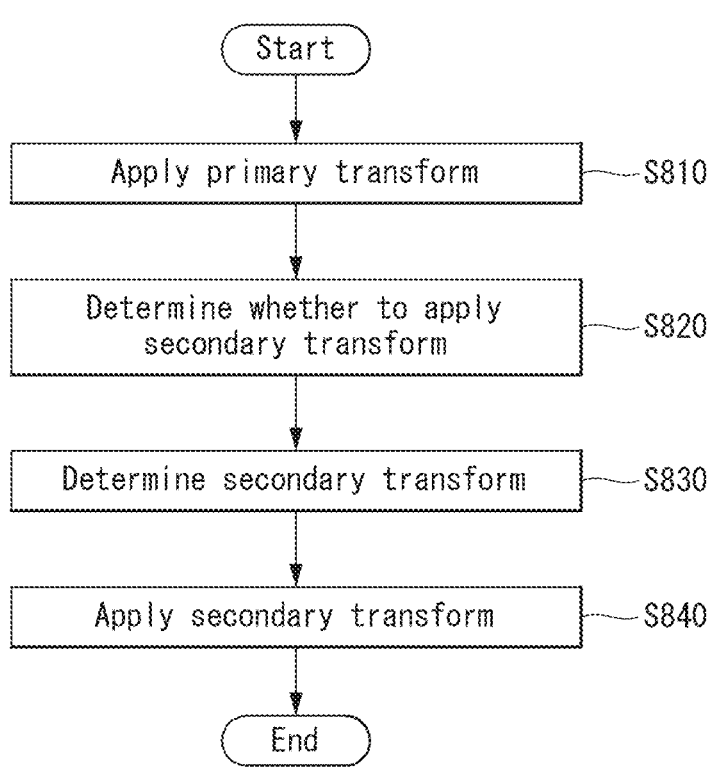
FIG. 8 illustrates an example of a flow chart for a transform when encoding a video signal according to an embodiment of the present disclosure.

FIG. 8 illustrates an example of a flow chart for a transform when encoding a video signal according to an embodiment of the present disclosure.

In step S810, the encoding apparatus 100 performs a primary transform on a residual block. The primary transform may be referred to as a core transform. In an embodiment, the encoding apparatus 100 may perform a primary transform using a transform kernel determined depending on multiple transform selection (MTS) to be described later.

Further, the encoding apparatus 100 may transmit, to the decoding apparatus 200, an MTS index indicating a specific MTS among MTS candidates. The MTS candidates may be determined based on an intra-prediction mode of a current block. The encoding apparatus 100 may transmit residual data in a state of omitting a transform. If the transform is omitted, the encoding apparatus 100 may encode a syntax element (e.g., transform skip flag) indicating that the transform is omitted, and include the corresponding syntax element in a bitstream.

The encoding apparatus 100 determines whether to apply a secondary transform, in S820. For example, the encoding apparatus 100 may determine whether the secondary transform is applied to a primarily transformed residual transform coefficient. For example, the secondary transform is a non-separable transform applied to coefficients located in a top left area (e.g., 4×4 or 8×8 top left area) in a block, and may be referred to a low frequency non-separable transform (LFNST). The secondary transform may be applied to a block to which an intra-prediction is applied.

The encoding apparatus 100 determines the secondary transform, in S830. The encoding apparatus 100 determines the secondary transform based on a secondary transform set designated depending on the intra-prediction mode. Before the step S830, the encoding apparatus 100 may determine an area, to which the secondary transform is applied based on a size of the current block, and an output size according to the transform. The encoding apparatus 100 performs the secondary transform using the secondary transform determined in the step S830, in S840.

Figure 9:
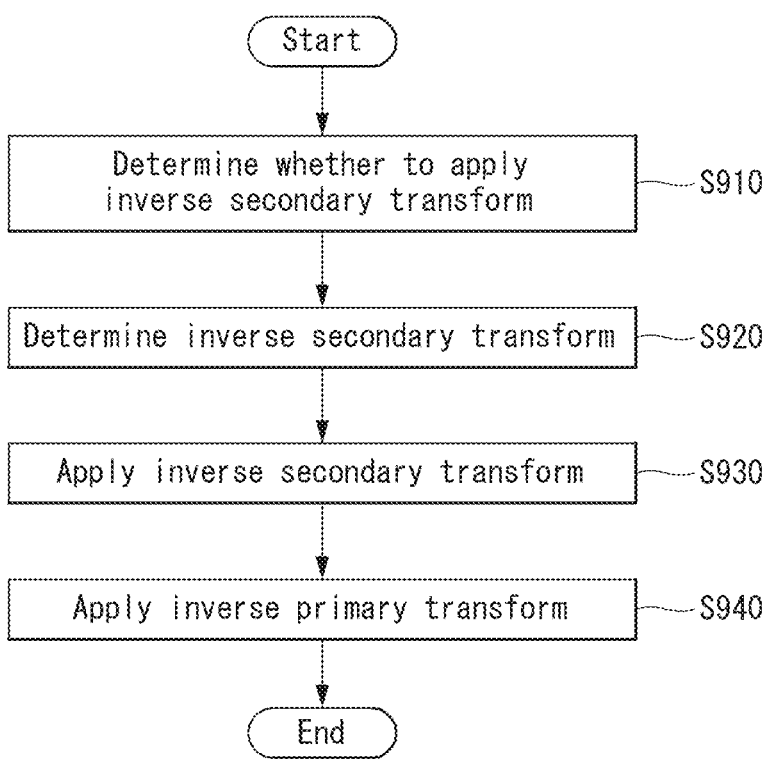
FIG. 9 illustrates an example of a flow chart for a transform in a decoding process of a video signal according to an embodiment of the present disclosure.

FIG. 9 illustrates an example of a flow chart for a transform in a decoding process of a video signal according to an embodiment of the present disclosure.

The decoding apparatus 200 determines whether to apply an inverse secondary transform, in S910. For example, the inverse secondary transform may be a non-separable transform applied for a top left area (e.g., 4×4 or 8×8 top left area) of a block including transform coefficients. For example, the decoding apparatus 200 may determine whether to apply the inverse secondary transform based on a syntax element (e.g., secondary transform flag) indicating whether to apply the secondary transform from the encoding apparatus 100.

The decoding apparatus 200 determines the inverse secondary transform, in S920. The decoding apparatus 200 may determine the inverse secondary transform applied to a current block based on a transform set designated depending on an intra-prediction mode. Before the step S920, the decoding apparatus 200 may determine an area to which the inverse secondary transform is applied based on a size of the current block. The decoding apparatus 200 performs the inverse secondary transform on a dequantized residual block using the inverse secondary transform determined in the step S920, in S930.

The decoding apparatus 200 performs an inverse primary transform on an inverse secondary transformed residual block, in S940. The inverse primary transform may be referred to as an inverse core transform. In an embodiment, the decoding apparatus 200 may perform the inverse primary transform using a transform kernel determined depending on MTS to be described later. Before the step S940, the decoding apparatus 200 may determine whether the MTS is applied to the current block. In this case, a step of determining whether the MTS is applied may be further included in the flow chart of the decoding illustrated in FIG. 9.

In an embodiment, if the MTS is applied to the current block (e.g., if a MTS flag of a CU level is 1), the decoding apparatus 200 may construct MTS candidates based on the intra-prediction mode of the current block. In this case, a step of constructing the MTS candidates may be further included in the flow chart of the decoding illustrated in FIG. 9. The decoding apparatus 200 may determine the inverse primary transform applied to the current block using an index indicating a specific MTS among the constructed MTS candidates. The decoding apparatus 200 may determine a transform kernel corresponding to the MTS index with reference to a table defining a relationship between the MTS index and the transform kernel.

In addition to DCT-2 and 4×4 DST-7 applied to HEVC, an adaptive (or explicit) multiple transform selection (MTS) scheme may be used for residual coding for inter- and intra-coded blocks. The MTS may be referred to as an adaptive multiple transform (AMT) or an explicit multiple transform (EMT). For example, as a transform according to an embodiment of the present disclosure, transforms selected from DCT/DST families may be used. For example, additional matrixes other than DCT-2 may include DST-7, DCT-8, DST-1, and DCT-5. The following Table 1 represents basic functions of selected DST/DCT.

TABLE 1

| Transform Type | Basis function Ti(j), i, j = 0, 1, . . . , N − 1 |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ <br> where $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right),$ <br> where $\omega_0 = \begin{cases} \sqrt{\dfrac{2}{N}} & i = 0 \\ 1 & i \neq 0 \end{cases}, \omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |

TABLE 1-continued

| Transform Type | Basis function Ti(j), i, j = 0, 1, . . . , N − 1 |
|---|---|
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

The MTS may be applied to CUs having a width and a height that are less than or equal to 64, and whether the MTS is applied may be controlled by a flag of a per CU basis (e.g., cu_mts_flag). If a CU level flag is 0, DCT-2 is applied to the CU in order to encode a residue. A luma coding block in the CU to which the MTS is applied may be signaled in order to identify horizontal and vertical transforms in which two additional flags will be used. If a transform skip mode is applied, a transform for residual samples of the block may be omitted. For coding (intra-residual coding) of the residual samples to which intra-prediction is applied, a mode-dependent transform candidate selection process may be used. Three transform subsets may be defined as in the following Table 2, and a transform subset may be selected based on an intra-prediction mode as shown in Table 3 below.

TABLE 2

| Transform Set | Transform Candidates |
|---|---|
| 0 | DST-VII, DCT-VIII |
| 1 | DST-VII, DST-I |
| 2 | DST-VII, DCT-VIII |

Along with a subset concept, a transform subset is initially confirmed based on Table 2 by using the intra-prediction mode of a CU having a CU-level MTS flag of 1. Thereafter, for each of a horizontal transform (indicated by EMT_TU_horizontal_flag) and a vertical transform (indicated by EMT_TU_vertical_flag), one of two transform candidates in the confirmed transform subset may be selected based on explicit signaling using flags according to Table 3.

TABLE 3

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | 53 | 54 | 55 | 56 | 57 | 58 | 59 | 60 | 61 | 62 | 63 | 64 | 65 | 66 |
|---|---|---|---|---|---|---|---|---|---|---|---|---|---|---|
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 |

In Table 3, 'Intra Mode' denotes the intra-prediction mode (67 mode basis) applied to the CU, 'V' denotes an index indicating a transform set for a vertical transform, and 'H' denotes an index indicating a transform set for a horizontal transform. As shown in Table 3, a transform set that can be applied per intra-prediction mode is configured, and EMT_TU_horizontal_flag/EMT_TU_vertical_flag indicates a transform kernel for horizontal/vertical transform in each horizontal/vertical transform set among transform candidates (Table 2) constituting horizontal/vertical transform sets (H/V) corresponding to the prediction mode.

TABLE 4

| Configuration group | Hori-zontal (row) transform | Hori-zontal (column) transform | 35 Intra Prediction modes | 67 Intra Prediction modes |
|---|---|---|---|---|
| Group 0 (G0) | 0 DST7 | DST7 | 0 | 0 |
| | 1 DCT5 | DST7 | | |
| | 2 DST7 | DCT5 | | |
| | 3 DCT5 | DCT5 | | |
| Group 1 (G1) | 0 DST7 | DST7 | 1, 3, 5, 7, 13, | 1, 3, 5, 7, 9, |
| | 1 DST1 | DST7 | 15, 17, 19, 21, | 11, 13, 23, 25, |
| | 2 DST7 | DST1 | 23, 29, 31, 33 | 27, 29, 31, 33, |
| | 3 DST1 | DST1 | | 35, 37, 39, 41, |
| | | | | 43, 45, 55, 57, |
| | | | | 59, 61, 63, 65 |
| Group 2 (G2) | 0 DST7 | DST7 | 2, 4, 6, 14, 16, | 2, 4, 6, 8, 10, |
| | 1 DCT8 | DST7 | 18, 20, 22, 30, | 12, 24, 26, 28, |
| | 2 DST7 | DCT8 | 32, 34 | 30, 32, 34, 36, |
| | 3 DCT8 | DCT8 | | 38, 40, 42, 44, |
| | | | | 56, 58, 60, 64, |
| | | | | 66 |
| Group 3 (G3) | 0 DST7 | DST7 | 8, 9, 10, 11, 12 | 14, 15, 16, 17, |
| | 1 DCT5 | DST7 | (Neighboring | 18, 19, 20, 21, |
| | 2 DST7 | DCT8 | angles to | 22 |
| | 3 DCT5 | DCT8 | horizontal | (Neighboring |
| | | | directions) | angles to |
| | | | | horizontal |
| | | | | directions) |
| Group 4 (G4) | 0 DST7 | DST7 | 24, 25, 26, 27, | 46, 47, 48, 49, |
| | 1 DCT8 | DST7 | 28 | 50, 51, 52, 53, |
| | 2 DST7 | DCT5 | (Neighboring | 54 |
| | 3 DCT8 | DCT5 | angles to | (Neighboring |
| | | | vertical | angles to |
| | | | directions) | vertical |
| | | | | directions |
| Group 5 (G5) | 0 DCT8 | DCT8 | Inter | Inter |
| | 1 DST7 | DCT8 | prediction | prediction |
| | 2 DCT8 | DST7 | | |
| | 3 DST7 | DST7 | | |

Table 4 illustrates an example of a transform configuration group, to which MITS is applied, as an embodiment to which the present disclosure is applied.

Referring to Table 4, transform configuration groups may be determined based on a prediction mode, and the number of groups may be 6 (G0 to G5). In addition, G0 to G4 correspond to a case to which intra-prediction is applied, and G5 represents transform combinations (or transform set or transform combination set) applied to a residual block generated by inter-prediction.

One transform combination may consist of a horizontal transform (or row transform) applied to rows of a corresponding 2D block and a vertical transform (or column transform) applied to columns thereof.

Each of the transform configuration groups may have four transform combination candidates. The four transform combination candidates may be selected or determined using transform combination indexes 0 to 3, and a transform combination index may be encoded and transmitted from an encoder to a decoder.

In an embodiment, residual data (or residual signal) obtained through intra-prediction may have different statistical characteristics depending on the intra-prediction mode. Thus, as shown in Table 4, transforms other than a normal cosine transform (e.g., DCT-2) may be applied per intra-prediction. In the present disclosure, a transform type may be represented as DCT-Type 2, DCT-II, and DCT-2, for example.

Referring to Table 4, a case of using 35 intra-prediction modes and a case of using 67 intra-prediction modes are shown. A plurality of transform combinations may be applied for each transform configuration group divided from each intra-prediction mode column. For example, a plurality of transform combinations may consist of four transform combinations. As a specific example, DST-7 and DCT-5 can be applied to group 0 in both the row (horizontal) direction and the column (vertical) direction, and thus a total of four combinations can be applied.

Since a total of four transform kernel combinations can be applied to each intra-prediction mode, a transform combination index for selecting one from among them can be transmitted per transform unit. In the present disclosure, the transform combination index may be referred to as an MTS index and may be represented by mts_idx.

Furthermore, there may occur a case in which DCT-2 is optimal for both the row direction and the column direction due to characteristics of a residual signal, in addition to the transform kernels shown in Table 4. Thus, a transform can be adaptively applied by defining an MTS flag for each coding unit. If the MTS flag is 0, DCT-2 may be applied for both the row direction and the column direction, and if the MTS flag is 1, one of four combinations may be selected or determined through an MTS index.

In an embodiment, if the number of transform coefficients is less than a specific value (e.g., 3) for one transform unit even if the MTS flag is 1, the transform kernels of Table 4 is not applied and the same transform kernel (e.g., DST-7) may be applied for both the row direction and the column direction.

In an embodiment, if transform coefficient values are previously parsed and the number of transform coefficients is less than a specific value (e.g., 3), an MTS index is not parsed and a specific transform kernel (e.g., DST-7) may be applied. Hence, an amount of transmission of additional information can be reduced.

In an embodiment, MTS may be applied only when a width or a height of the transform unit is equal to or less than a threshold size (e.g., 32), or MTS may be applied only when both the width and the height of the transform unit is equal to or less than the threshold size (e.g., 32).

In an embodiment, the transform configuration groups as shown in Table 4 may be pre-configured through off-line training.

In an embodiment, the MTS index may be defined as one index that can simultaneously indicate a combination of the horizontal transform and the vertical transform. Further, the MTS index may be defined as each of a separate horizontal transform index and a separate vertical transform index.

Figure 10:
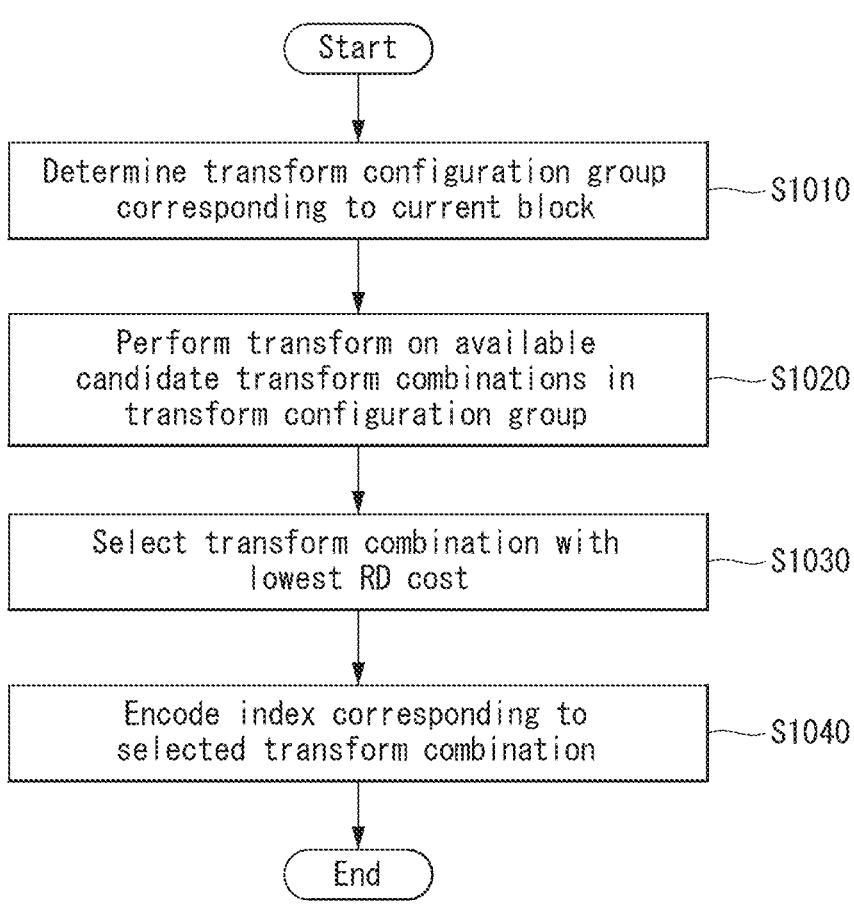
FIG. 10 illustrates an example of a flow chart for performing a transform through multiple transform selection in an encoding process of a video signal according to an embodiment of the present disclosure.

FIG. 10 illustrates an example of a flow chart for performing a transform through multiple transform selection in an encoding process of a video signal according to an embodiment of the present disclosure.

Although the present disclosure basically describes an embodiment for a separable transform in which a transform is applied by being separated in the horizontal direction and the vertical direction, a transform combination may consist of non-separable transforms.

Alternatively, a transform combination may be configured as a mixture of separable transforms and non-separable transforms. In this case, if the non-separable transform is used, transform selection per row/column or selection per the horizontal/vertical direction is unnecessary, and the transform combinations of Table 4 can be used only when separable transform is selected.

In addition, methods described in the present disclosure can be applied irrespective of the primary transform or the secondary transform. That is, there is no limit in which the methods shall be applied only to one of the two transforms, and the methods can be applied to all the two transforms. The primary transform may refer to a transform for first transforming a residual block, and the secondary transform may refer to a transform for applying a transform to a block generated as a result of the primary transform.

First, the encoding apparatus 100 may determine a transform group corresponding to a current block, in S1010. The transform group may refer to a transform group of Table 4, but the present disclosure is not limited thereto. For example, the transform group may consist of other transform combinations.

The encoding apparatus 100 may perform a transform on available candidate transform combinations in the transform group, in S1020. As a result of the transform, the encoding apparatus 100 may determine or select a transform combination with the lowest rate distortion (RD) cost, in S1030. The encoding apparatus 100 may encode a transform combination index corresponding to the selected transform combination in S1040.

Figure 11:
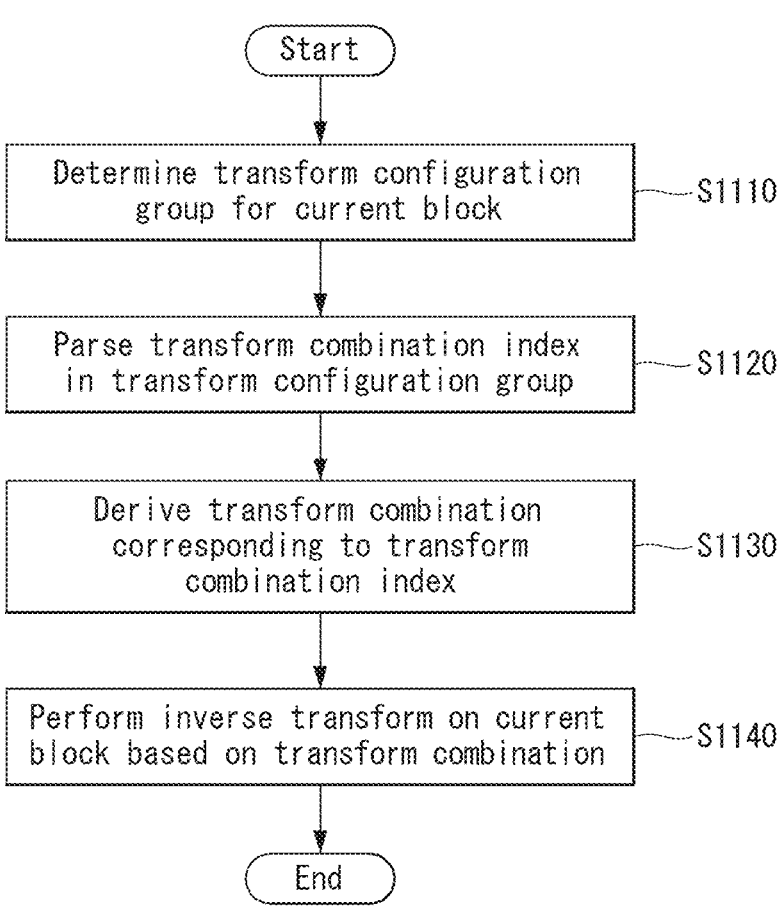
FIG. 11 illustrates an example of a flow chart for performing a transform through multiple transform selection in a decoding process of a video signal according to an embodiment of the present disclosure.

FIG. 11 illustrates an example of a flow chart for performing a transform through multiple transform selection in a decoding process of a video signal according to an embodiment of the present disclosure. First, the decoding apparatus 200 may determine a transform group for a current block, in S1110. The decoding apparatus 200 may parse a transform combination index, and the transform combination index may correspond to one of a plurality of transform combinations in the transform group, in S1120. The decoding apparatus 200 may derive a transform combination corresponding to the transform combination index, in S1130. Although the transform combination may refer to a transform combination described in Table 4, the present disclosure is not limited thereto. That is, the transform combination may be configured as other transform combinations.

The decoding apparatus 200 may perform an inverse transform on the current block based on the transform combination, in S1140. When the transform combination consists of a row transform and a column transform, the column transform may be first applied, and then the row transform may be applied. However, the present disclosure is not limited thereto, and the row transform may be applied and then the column transform may be applied. Alternatively, when the transform combination consists of non-separable transforms, a non-separable transform may be immediately applied. In some embodiments, a process of determining a transform group and a process of parsing a transform combination index may be performed at the same time.

In an embodiment of the present disclosure, as described below, two MTS candidates may be used for directional modes, and four MTS candidates may be used for nondirectional modes.

A) Nondirectional Modes (DC and Planar)

When MTS index is 0, DST-7 is used for horizontal and vertical transforms

When MTS index is 1, DST-7 is used for vertical transform and DCT-8 is used for horizontal transform When MTS index is 2, DCT-8 is used for vertical transform and DST-7 is used for horizontal transform When MTS index is 3, DCT-8 is used for horizontal and vertical transforms B) Modes Belonging to Horizontal Group Modes When MTS index is 0, DST-7 is used for horizontal and vertical transforms When MTS index is 1, DCT-8 is used for vertical transform and DST-7 is used for horizontal transform C) Modes Belonging to Vertical Group Modes When MTS index is 0, DST-7 is used for horizontal and vertical transforms When MTS index is 1, DST-7 is used for vertical transform and DCT-8 is used for horizontal transform Here (in the case where 67 intra-prediction modes are used), horizontal group modes include intra-prediction modes of Nos. 2 to 34, and vertical modes include intra-prediction modes of Nos. 35 to 66.

In another embodiment of the present disclosure, three MTS candidates may be used for all the intra-prediction modes.

When MTS index is 0, DST-7 is used for horizontal and vertical transforms

When MTS index is 1, DST-7 is used for vertical transform and DCT-8 is used for horizontal transform When MTS index is 2, DCT-8 is used for vertical transform and DST-7 is used for horizontal transform In another embodiment of the present disclosure, two MTS candidates may be used for directional prediction modes, and three MTS candidates may be used for nondirectional modes.

A) Nondirectional Modes (DC and Planar)

When MITS index is 0, DST-7 is used for horizontal and vertical transforms

When MTS index is 1, DST-7 is used for vertical transform and DCT-8 is used for horizontal transform When MTS index is 2, DCT-8 is used for vertical transform and DST-7 is used for horizontal transform B) Prediction Modes Corresponding to Horizontal Group Modes When MTS index is 0, DST-7 is used for horizontal and vertical transforms When MITS index is 1, DCT-8 is used for vertical transform and DST-7 is used for horizontal transform C) Prediction Modes Corresponding to Vertical Group Modes When MITS index is 0, DST-7 is used for horizontal and vertical transforms When MTS index is 1, DST-7 is used for vertical transform and DCT-8 is used for horizontal transform In another embodiment of the present disclosure, one MITS candidate (e.g., DST-7) may be used for all the intra-modes. In this case, encoding time can be reduced by 40% along with a minor coding loss. In addition, one flag may be used to indicate one of DCT-2 and DST-7.

A method for performing the decoding based on information related to MTS of the encoding apparatus 100 according to an embodiment of the present disclosure is as follows.

The decoding apparatus 200 according to an embodiment of the present disclosure may obtain a flag sps_mts_intra_enabled_flag indicating whether a flag cu_mts_flag indicating whether to apply MTS is present in in a residual coding syntax of an intra-coding unit, or a flag sps_mts_inter_enabled_flag indicating whether a flag cu_mts_flag indicating whether to apply MTS is present in in a residual coding syntax of an inter-coding unit. For example, if sps_mts_intra_enabled_flag=0, cu_mts_flag is not present in the residual coding syntax of the intra-coding unit, and if sps_mts_intra_enabled_flag=1, cu_mts_flag is present in the residual coding syntax of the intra-coding unit. In addition, sps_mts_inter_enabled_flag indicates whether cu_mts_flag is present in the residual coding syntax of the inter-coding unit. For example, if sps_mts_inter_enabled_flag=0, cu_mts_flag is not present in the residual coding syntax of the inter-coding unit, and if sps_mts_inter_enabled_flag=1, cu_mts_flag is present in the residual coding syntax of the inter-coding unit.

The decoding apparatus 200 may obtain cu_mts_flag based on sps_mts_intra_enabled_flag or sps_mts_inter_enabled_flag. For example, when sps_mts_intra_enabled_flag=1 or sps_mts_inter_enabled_flag=1, the decoding apparatus 200 may obtain cu_mts_flag. Here, cu_mts_flag indicates whether MTS is applied to a residual sample of a luma transform block. For example, if cu_mts_flag=0, MTS is not applied to the residual sample of the luma transform block, and if cu_mts_flag=1, MITS is applied to the residual sample of the luma transform block.

The decoding apparatus 200 may obtain an MITS index mts_idx based on cu_mts_flag. For example, when cu_mts_flag=1, the decoding apparatus 200 may obtain mts_idx. Here, mts_idx indicates which transform kernel is applied to luma residual samples of a current transform block in the horizontal direction and/or the vertical direction. For example, at least one of embodiments described in the present disclosure may be applied for mts_idx.

The decoding apparatus 200 may derive a transform kernel corresponding to mts_idx. For example, the transform kernel corresponding to mts_idx may be defined by being divided into a horizontal transform and a vertical transform.

For example, if MITS is applied to the current block (i.e., cu_mts_flag=1), the decoding apparatus 200 may construct MITS candidates based on the intra-prediction mode of the current block. Further, the decoding apparatus 200 may determine an MTS candidate applied to the current block from among the constructed MTS candidates using mts_idx.

As another example, different transform kernels may be applied to the horizontal transform and the vertical transform. However, the present disclosure is not limited thereto, and the same transform kernel may be applied to the horizontal transform and the vertical transform.

The decoding apparatus 200 may perform an inverse transform based on the transform kernel.

Furthermore, in the present disclosure, MTS may be represented as AMT or EMT, and mts_idx may be represented as AMT_idx, EMT_idx, AMT_TU_idx, EMT_TU_idx, or the like, in the same manner. The present disclosure is not limited thereto.

The present disclosure is described by being divided into a case, in which the MTS is applied, and a case, in which the MTS is not applied, based on the MTS flag, but embodiments of the present disclosure are not limited to such an expression. For example, whether to apply the MTS may be the same meaning as whether to use other transform types (or transform kernels) other than a predefined specific transform type (which may be referred to as a basic transform type, a default transform type, etc.). If the MTS is applied, a transform type (e.g., any one transform type or a combined transform type of two or more transform types among a plurality of transform types) other than a basic transform type may be used for a transform. Further, if the MTS is not applied, the basic transform type may be used for the transform. In an embodiment, the basic transform type may be configured (or defined) as DCT-2.

As an example, when an MTS flag syntax indicating whether the MTS is applied to a current transform block, and an MTS index syntax indicating a transform type applied to the current transform block if the MTS are applied may also be individually transmitted from the encoding apparatus 100 to the decoding apparatus 200. As another example, when whether the MTS is applied to a current transform block, and a syntax (e.g., MTS index) including all the transform types applied to the current transform block if the MTS are applied may also be transmitted from the encoding apparatus 100 to the decoding apparatus 200. That is, in the latter example, a syntax (or syntax element) indicating a transform type applied to the current transform block (or unit) may be transmitted from the encoding apparatus 100 to the decoding apparatus 200 within all of transform type groups (or transform type sets) including the above-described basic transform type.

Accordingly, the MTS index may represent together a transform type applied to the current transform block and whether to apply MTS. In other words, in the latter embodiment, only an MTS index may be signaled without an MTS flag. In this case, DCT-2 may be interpreted as being included in MTS. However, in the present disclosure, a case where DCT-2 is applied may be described as a case where MTS is not applied. Nevertheless, a technical range related to MTS is not limited to corresponding defined contents.

A method for the decoding apparatus 200 to generate a block including residual samples from a transform block through an inverse transform may be as follows.

Input to this process is as follows:

luma position (xTbY, yTbY) indicating a top left sample of a current luma transform block for a top left luma sample of a current picture, a variable nTbW indicating a width of a current transform block, a variable nTbH indicating a height of the current transform block, a variable cIdx indicating a chroma component of a current block, (nTbW)×(nTbH) array d[x][y] of scaled transform coefficients for x=0 . . . nTbW−1, and y=0 . . . nTbH−1.

Output from this process is (nTbW)×(nTbH) array r[x][y] of residual samples for x=0 . . . nTbW−1, and y=0 . . . nTbH−1.

A variable trTypeHor indicating a horizontal transform kernel and a variable trTypeVer indicating a vertical transform kernel may be derived based on mts_idx[x][y] and CuPredMode[x][y] of Table 5.

The (nTbW)×(nTbI) array of the residual samples may be derived as follows:

1. A (vertical) column of each scaled transform coefficient d[x][y] (x=0 . . . nTbW−1, y=0 . . . nTbH−1) is transformed into e[x][y] (x=0 . . . nTbW−1, y=0 . . . nTbH−1) by an one-dimensional transform process for a column x=0 . . . nTbW−1. In this case, an input is a transform type variable trType which is set to be same as the height nTbH of the transform block, the list d[x][y] (y=0 . . . nTbH−1), and trTypeVer, and the list e[x][y] (y=0 . . . nTbH−1) is output.

2. Intermediate sample values g[x][y] (x=0 . . . nTbW−1, y=0 . . . nTbH−1) are derived as in Equation 4 below.

$$g[x][y] = \text{Clip3}(\textit{Coeff}\text{Min}, \textit{Coeff}\text{Max}, (e[x][y] + 256) \gg 9)$$

25 26

3. A (horizontal) row of each intermediate array g[x][y] (x=0 . . . nTbW−1, y=0 . . . nTbH−1) is transformed into r[x][y] (x=0 . . . nTbW−1, y=0 . . . nTbH−1) by an one-dimensional (1D) transform process for each row y=0 . . . nTbH−1. In this case, an input is a transform type variable trType which is set to be same as the width nTbW of the transform block, the list g[x][y](x=0 . . . nTbW−1), and trTypeHor, and the list r[x][y] (x=0 . . . nTbW−1) is output.

Considering a non-zero width (nonZeroW) and a non-zero height (nonZeroH) by zero-out described below, a process of deriving a residual sample array may be represented again as follows.

1. For each column of a scaled (nonZeroW)×(nonZeroH) array transform coefficient block d[x][y] (where x=0 . . . nonZeroW−1, y=0 . . . nonZeroH−1) (each column is distinguished by x=0 . . . nonZeroW−1), the corresponding 1D transform process is called (by a total of nonZeroW calls), and thus (nonZeroW)×(nTbH) array block e[x][y] is obtained as an output, where x=0 . . . nonZeroW−1, y=0 . . . nTbH−1. When the corresponding 1D transform process for x-th column is called, a length nTbH of the transform, a scaled transform coefficient vector length non-ZeroH, a scaled transform coefficient vector d[x][y] (where x value denotes x-th column, y=0 . . . nonZeroH−1), and trTypeVer denoting a transform type (transferred to parameter trType) are transferred as input factors, and vector (list) e[x][y] is obtained as an output of the corresponding 1D transform process (where x value denotes x-th column, y=0 . . . nTbH−1)

2. Intermediate sample values g[x][y] (x=0 . . . nonZeroW−1, y=0 . . . nTbH−1) are derived as in Equation 4 below.

$$g[x][y] = \text{Clip3}(\textit{Coeff}\,\text{Min},\ \textit{Coeff}\,\text{Max},\ (e[x][y] + 64) \gg 7)$$

3. For each row of (nonZeroW)×(nTbH) array block g[x][y] (where x=0 . . . nonZeroW−1, y=0 . . . nTbH−1) (each row is distinguished by y=0 . . . nTbH−1), the corresponding 1D transform process is called (by a total of nTbH calls), and thus the (nTbW)×(nTbH) array block r[x][y] is obtained as an output (where x=0 . . . nTbW−1, y=0 . . . nTbH−1). When the corresponding 1D transform process for y-th row is called, a length nTbW of the transform, an input vector length non-ZeroW, an input vector g[x][y] (where y value denotes the y-th row, x=0 . . . nonZeroW-1), and trTypeHor denoting a transform type (transferred to parameter trType) are transferred as input factors, and vector (list) r[x][y] (where y value denotes the y-th row, x=0 . . . nTbW−1) is obtained as an output of the corresponding 1D transform process (where y value denotes the y-th row, x=0 . . . nTbW−1).

TABLE 5

| mts_idx[ x ][ y ] | CuPredMode[ x ][ y ] == MODE_INTRA | | CuPredMode[ x ][ y ] == MODE_INTER | |
|---|---|---|---|---|
| | trTypeHor | trTypeVer | trTypeHor | trTypeVer |
| −1 (inferred) | 0 | 0 | 0 | 0 |
| 0 (00) | 1 | 1 | 2 | 2 |
| 1 (01) | 2 | 1 | 1 | 2 |
| 2 (10) | 1 | 2 | 2 | 1 |
| 3 (11) | 2 | 2 | 1 | 1 |

In Table 5, CuPredMode denotes a prediction mode applied to a current CU, trTypeHor denotes a type of a transform kernel for a horizontal transform, and trTypeVer denotes a type of a transform kernel for a vertical transform.

Embodiments of the present disclosure provide a syntax element for MTS. A sequence parameter set according to an embodiment of the present disclosure may include a flag (sps_mts_intra_enabled_flag) indicating whether an MTS flag or an MTS index is present in a low level syntax for an intra-coding unit (e.g., residual coding syntax, transform unit syntax), and a flag (sps_mts_inter_enabled_flag) indicating whether the MITS flag or the MTS index is present in a low level syntax for an inter-coding unit.

According to a syntax structure for decoding of a transform unit according to an embodiment of the present disclosure, if specific condition is satisfied, the decoding apparatus 200 may parse an MTS flag (cu_mts_flag). For example, the condition for parsing the MTS flag may include a case in which sps_mts_intra_enabled_flag is 1 while a prediction mode of a current coding unit is an intra-prediction mode or sps_mts_inter_enabled_flag is 1 while the prediction mode of the current coding unit is an inter-prediction mode, there is a non-zero transform coefficient for a luma component, a current tree type is not a dual tree for a chroma component, and each of a width and a height of a transform block is less than or equal to a specific length (e.g., 32).

After the MTS index (cu_mts_flag) is obtained, for example, if cu_mts_flag=0, MITS is not applied to a residual sample of a luma transform block, and if cu_mts_flag=1, MITS may be applied to the residual sample of the luma transform block.

As described above, the present disclosure dividedly describes a case of applying the MTS and a case of not applying the MTS based on the MITS flag, but the present disclosure is not limited thereto. For example, whether to apply the MITS may mean whether to use transform types (or transform kernels) other than a predefined specific transform type (which may be referred to as a basic transform type, a default transform type, etc.). If the MTS is applied, a transform type (e.g., any one of a plurality of transform types or a combination of two or more transform types) other than the basic transform type may be used for the transform, and if the MTS is not applied, the basic transform type may be used for the transform. In an embodiment, the basic transform type may be configured (or defined) as DCT-2.

For example, an MITS flag syntax indicating whether MTS is applied to a current transform block, and an MTS index syntax indicating a transform type applied to the current block when MTS is applied may be individually transmitted from the encoding apparatus 100 to the decoding apparatus 200. As another example, a syntax (e.g., MTS index) including both information about whether MTS is applied to the current transform block and a transform type applied to the current block when MTS is applied may be transmitted from the encoding apparatus 100 to the decoding apparatus 200. That is, in the latter embodiment, a syntax (or syntax element) indicating a transform type applied to the current transform block (or unit) in all of transform type groups (or transform type set) including the aforementioned basic transform type may be transmitted from the encoding apparatus 100 to the decoding apparatus 200.

Accordingly, despite the expression, a syntax (MTS index) indicating the transform type applied to the current transform block may include information about whether MTS is applied. In other words, in the latter embodiment, only an MTS index may be signaled without an MTS flag.

In this case, DCT-2 may be interpreted as being included in MTS. However, the present disclosure may describe a case of applying DCT-2 as a case of not applying the MTS. Nevertheless, a technical range related to the MITS is not limited to corresponding defined contents.

According to an embodiment of the present disclosure, flag (transform_skip_flag) indicating whether there is a transform skip, and the MITS index (mts_idx) may be signaled via a residual syntax. However, this is merely an example, and the present disclosure is not limited thereto. For example, transform_skip_flag and/or mts_idx syntax may be signaled via a transform unit syntax.

Hereinafter, a method is proposed to improve complexity by applying a primary transform only to a predefined area. When combinations of various transforms (or transform kernels) such as MITS (e.g., DCT-2, DST-7, DCT-8, DST-1, DCT-5, etc.) are selectively applied to the primary transform, complexity may increase. Particularly, various transforms need to be considered as a size of a coding block (or transform block) increases, which may considerably increase complexity.

Accordingly, an embodiment of the present disclosure proposes a method for performing a transform only on a predefined area according to specific conditions, instead of performing (or applying) the transform on all the areas in order to reduce complexity.

In an embodiment, according to a reduced transform (RT) method, the encoding apparatus 100 may obtain an encoder may obtain an R×R transform block instead of an M×M transform block by applying a forward primary transform to an M×M pixel block (luma block). For example, an R×R area may be a top-left R×R area in a current block (coding block, transform block). The decoding apparatus 200 may obtain an M×M transform block by performing an inverse primary transform only on an R×R (M≥R) area.

Consequently, non-zero coefficients may be present only in the R×R area. For example, in this case, the decoding apparatus 200 may zero-out coefficients present in areas other than the R×R area without performing calculation therefor. The encoding apparatus 100 may perform a forward transform so that only the R×R area remains (so that non-zero coefficients are present only in the R×R area).

Further, the decoding apparatus 200 may apply a primary transform (i.e., inverse transform) only to a predefined area determined depending on a size of a coding block (or transform block) and/or transform (or transform kernel) type. The following table 6 shows an example of a reduced adaptive multiple transform (RAMT) using a predefined R (which may be referred to as a reduced factor, a reduced transform factor, etc.) value depending on a size of a transform (or a size of a transform block). In the present disclosure, the RAMT representing a reduced transform adaptively determined depending on a block size may be referred to as a reduced MTS, a reduced explicit multiple transform, a reduced primary transform, etc.

TABLE 6

| Transform size | Reduced transform 1 | Reduced transform 2 | Reduced transform 3 |
|---|---|---|---|
| 8 × 8 | 4 × 4 | 6 × 6 | 6 × 6 |
| 16 × 16 | 8 × 8 | 12 × 12 | 8 × 8 |
| 32 × 32 | 16 × 16 | 16 × 16 | 16 × 16 |
| 64 × 64 | 32 × 32 | 16 × 16 | 16 × 16 |
| 128 × 128 | 32 × 32 | 16 × 16 | 16 × 16 |

Referring to Table 6, at least one reduced transform may be defined depending on a size of a transform (or a size of a transform block). In an embodiment, which reduced transform from among reduced transforms illustrated in Table 6 is used may be determined according to a transform (or transform kernel) applied to a current block (coding block or transform block). Although Table 6 assumes that three reduced transforms are used, the present disclosure is not limited thereto. One or more various reduced transforms may be predefined depending on the size of the transform.

Further, in an embodiment of the present disclosure, a reduced transform factor (R) may be determined depending on the primary transform in application of the aforementioned reduced adaptive multiple transform. For example, if the primary transform is DCT-2, a reduction of coding performance can be minimized by not using the reduced transform for a small-sized block or by using a relatively large R value because computational complexity of DCT-2 is relatively lower than those of other primary transforms (e.g., a combination of DST-7 and/or DCT-8). The following Table 7 shows an example of an RAMT using a predefined R value depending on a size of a transform (or a size of a transform block) and a transform kernel.

TABLE 7

| Transform size | Reduced transform for DCT2 | Reduced transform except DCT2 |
|---|---|---|
| 8 × 8 | 8 × 8 | 4 × 4 |
| 16 × 16 | 16 × 16 | 8 × 8 |
| 32 × 32 | 32 × 32 | 16 × 16 |
| 64 × 64 | 32 × 32 | 32 × 32 |
| 128 × 128 | 32 × 32 | 32 × 32 |

Referring to Table 7, if a transform applied to the primary transform is DCT-2 and if the transform applied to the primary transform is a transform other than DCT-2 (e.g., combination of DST7 and/or DCT8), different reduced transform factors may be used.

An operation of the encoding apparatus 100 for applying a reduced transform according to an embodiment of the present disclosure is as below. First, the encoding apparatus 100 determines whether to apply a transform to a current block. The encoding apparatus 100 may encode a transform skip flag depending on the determined result. In this case, the encoding apparatus 100 may encode the transform skip flag.

If the transform is applied to the current block, the encoding apparatus 100 determines a transform kernel to be applied to a primary transform of the current block. The encoding apparatus 100 may encode a transform index indicating the determined transform kernel. The encoding apparatus 100 determines an area, in which a significant coefficient is present in the current block, based on the transform kernel applied to the primary transform of the current block and a size of the current block.

In an embodiment, if a transform kernel indicated by a transform index is a predefined transform and a width and/or a height of a current block are greater than a predefined size, the encoding apparatus 100 may determine an area having a width and/or a height of the predefined size as an area in which the significant coefficient is present.

For example, the predefined transform may be one of a plurality of transform combinations consisting of combinations of DST-7 and/or DCT-8, and the predefined size may be 16. Alternatively, the predefined transform may be a transform except DCT-2. As an example, if a transform kernel indicated by a transform index is DCT-2 and a width and/or a height of a current block are greater than 32, the encoding apparatus 100 may determine an area having the width and/or the height of 32 as an area to which the primary transform is applied.

Further, in an embodiment, if a transform kernel indicated by a transform index belongs to a first transform group, the encoding apparatus 100 may determine a smaller value of a width of a current block and a first threshold value as a width of an area in which a significant coefficient (non-zero coefficient) according to the primary transform is present, and may determine a smaller value of a height of the current block and the first threshold value as a height of an area in which the significant coefficient is present. For example, the first threshold value may be 32, but the present disclosure is not limited thereto. For example, the first threshold value may be 4, 8, or 16 as shown in Table 6 or Table 7.

In addition, if the transform kernel indicated by the transform index belongs to a second transform group, the encoding apparatus 100 may determine a smaller value of the width of the current block and a second threshold value as a width of an area to which the primary transform is applied, and may determine a smaller value of the height of the current block and the second threshold value as the height of the area in which the significant coefficient is present. For example, the second threshold value may be 16, but the present disclosure is not limited thereto. For example, the second threshold value may be 4, 6, 8, 12, or 32 as shown in Table 6 or Table 7.

In an embodiment, the first transform group may include DCT-2, and the second transform group may include a plurality of transform combinations consisting of combinations of DST-7 and/or DCT-8.

The encoding apparatus 100 performs a forward primary transform using the transform kernel applied to the primary transform of the current block. The encoding apparatus 100 may a primarily transformed transform coefficients in the area in which the significant coefficient is present by performing the forward primary transform. In an embodiment, the encoding apparatus 100 may apply a secondary transform to the primarily transformed transform coefficient.

An operation of the decoding apparatus 200 for applying a reduced transform according to an embodiment of the present disclosure is as below. The decoding apparatus 200 checks whether a transform skip is applied to a current block. If the transform skip is not applied to a current block, the decoding apparatus 200 obtains, from a video signal, a transform index indicating a transform kernel applied to the current block.

The decoding apparatus 200 determines an area, in which a primary transform (i.e., inverse primary transform) is applied to the current block, based on the transform kernel indicated by the transform index and a size (i.e., width and/or height) of the current block. In an embodiment, the decoding apparatus 200 may derive coefficients of a remaining area other than the area, to which the primary transform is applied, as zero in the current block. In addition, if the transform kernel indicated by the transform index is a predefined transform and the width and/or the height of the current block are greater than a predefined size, the decoding apparatus 200 may determine an area having a width and/or a height of the predefined size as the area to which the primary transform is applied.

For example, the predefined transform may be any one of a plurality of transform combinations consisting of combinations of DST-7 and/or DCT-8, and the predefined size may be 16. Alternatively, the predefined transform may be a transform except DCT-2. For example, if the transform kernel indicated by the transform index is DCT-2 and the width and/or the height of the current block are greater than 32, the decoding apparatus 200 may determine an area having a width and/or a height of 32 as the area to which the primary transform is applied.

Furthermore, in an embodiment, if a transform kernel indicated by a transform index belongs to a first transform group, the decoding apparatus 200 may determine a smaller value of the width of the current block and a first threshold value as a width of an area to which the primary transform is applied, and may determine a smaller value of the height of the current block and the first threshold value as a height of an area to which the primary transform is applied. For example, the first threshold value may be 32, but the present disclosure is not limited thereto. For example, the first threshold value may be 4, 8, or 16 as shown in Table 6 or Table 7.

In addition, if the transform kernel indicated by the transform index belongs to a second transform group, the decoding apparatus 200 may determine a smaller value of the width of the current block and a second threshold value as the width of the area to which the primary transform is applied, and may determine a smaller value of the height of the current block and the second threshold value as the height of the area to which the primary transform is applied. For example, the second threshold value may be 16, but the present disclosure is not limited thereto. For example, the second threshold value may be 4, 6, 8, 12, or 32 as shown in Table 6 or Table 7.

In an embodiment, the first transform group may include DCT-2, and the second transform group may include a plurality of transform combinations consisting of combinations of DST-7 and/or DCT-8.

The decoding apparatus 200 performs an inverse primary transform on the area, to which the inverse primary transform is applied, using the transform kernel indicated by the transform index. The decoding apparatus 200 may obtain inverse primary transformed transform coefficients by performing the inverse primary transform. In an embodiment, the decoding apparatus 200 may apply an inverse secondary transform to a dequantized transform coefficient before performing the inverse primary transform.

First Embodiment

According to an embodiment of the present disclosure, worst case complexity can be considerably reduced by performing a transform only on a predefined area according to specific conditions.

In addition, in an embodiment of the present disclosure, if an MTS (EMT or AMT) flag is 0 (i.e., if DCT-2 transform is applied in both a horizontal (lateral) direction and a vertical (longitudinal) direction), the decoding apparatus 200 may leave only 32 coefficients from each of the left side and the upper side in the horizontal and vertical directions and perform zero-out for a high frequency component (i.e., derive or set the high frequency component as 0). Although this embodiment is referred to as the first embodiment for convenience of explanation in embodiments to be described later, embodiments of the present disclosure are not limited thereto.

For example, for a 64×64 TU (or CU), the decoding apparatus 200 may leave transform coefficients only for a 32×32 top left area and perform zero-out for coefficients of a remaining area. Further, for a 64×16 TU, the decoding apparatus 200 may leave transform coefficients only for a 32×16 top left area and perform zero-out for coefficients of a remaining area. In addition, for an 8×64 TU, the decoding apparatus 200 may leave transform coefficients only for a 8×32 top left area and perform zero-out for coefficients of a remaining area. That is, it may be configured so that transform coefficients are present only for a maximum length of 32 in both the horizontal and vertical directions, which can improve transform efficiency.

In an embodiment, such a zero-out method may be applied only to a residual signal to which intra-prediction is applied, or may be applied only to a residual signal to which inter-prediction is applied, or applied to both a residual signal to which intra-prediction is applied and a residual signal to which inter-prediction is applied.

Second Embodiment

In an embodiment of the present disclosure, if an MTS flag is 1 (i.e., if a transform (e.g., DST-7 or DCT-8) other than DCT-2 transform is applicable in the horizontal direction and the vertical direction), the decoding apparatus 200 may leave coefficients of a specific top-left area and perform zero-out for a remaining high frequency component (i.e., derive or set the high frequency component as 0). Although this embodiment is referred to as the second embodiment for convenience of explanation in embodiments to be described later, embodiments of the present disclosure are not limited thereto.

In an embodiment, the decoding apparatus 200 may be configured to leave only a transform coefficient area of a part of the top-left area as in the following example. That is, the encoding apparatus 100 may leave coefficients of a pre-defined top-left area and perform zero-out for a remaining high frequency component, and the decoding apparatus 200 may preset the length (or the number) of transform coefficients in the horizontal and/or vertical directions to which an inverse primary transform is applied depending on a width and/or a height. For example, coefficients outside the length to which a primary transform is applied may be zero-out.

If a width (w) is equal to or greater than $2^n$, transform coefficients only for a length of $w/2^p$ from the left side may be left, and transform coefficients of a remaining area may be fixed (or set or derive) to zero (zero-out).

If a height (h) is equal to or greater than $2^m$, transform coefficients may be left only for a length of $h/2^q$ from the top, and transform coefficients of a remaining area may be fixed to a value of 0.

For example, values m, n, p, and q may be predefined as various values. For example, the values m, n, p, and q may be set to integer values equal to or greater than 0. Alternatively, they may be set as in the following examples.

1) (m, n, p, q)=(5, 5, 1, 1)
2) (m, n, p, q)=(4, 4, 1, 1)

For example, if they are predefined as the example of 1), transform coefficients may be left only for a 16×16 top left area in a 32×16 TU, and transform coefficients may be left only for a 8×16 top left area in an 8×32 TU.

In an embodiment, such a zero-out method may be applied only to a residual signal to which intra-prediction is applied, or may be applied only to a residual signal to which inter-prediction is applied, or applied to both a residual signal to which intra-prediction is applied and a residual signal to which inter-prediction is applied.

Third Embodiment

In another embodiment of the present disclosure, when an MTS flag is 1 (i.e., if a transform (e.g., DST-7 or DCT-8)

other than DCT-2 transform is applicable in the horizontal direction and the vertical direction), the decoding apparatus 200 may leave coefficients of a specific top-left area and perform zero-out for a remaining high frequency component (i.e., derive or set the high frequency component as zero). Alternatively, more specifically, the encoding apparatus 100 may leave coefficients of a predefined top-left area and perform zero-out for a remaining high frequency component, and the decoding apparatus 200 may previously recognize a zero-out area and perform decoding using coefficients of the non-zero-out area. However, embodiments of the present disclosure are not limited thereto, and the zero-out process from a decoder perspective may be understood as a process of deriving (or recognizing or setting) a zero-out area as zero. Although this embodiment is referred to as the third embodiment for convenience of explanation in embodiments to be described later, embodiments of the present disclosure are not limited thereto.

In an embodiment, the decoding apparatus 200 may be configured to leave only a transform coefficient area of a part of the top-left area as in the following example. That is, the decoding apparatus 200 may preset the length (or the number) of transform coefficients in the horizontal and/or vertical directions to which an inverse primary transform is applied depending on a width and/or a height. For example, coefficients outside the length to which the inverse primary transform is applied may be zero-out.

When the height (h) is equal to or greater than the width (w) and is equal to or greater than $2^n$, only a w×(h/2^p) top-left area may leave a transform coefficient, and a transform coefficient of a remaining area may be fixed (or set or derive) to zero.

When the width (w) is greater than the height (h) and is equal to or greater than $2^m$, only a (w/2^q)×h top-left area may leave a transform coefficient, and a transform coefficient of a remaining area may be fixed to zero.

Although the above-described example describes that the length in the vertical direction is reduced to (h/2^p) when the height (h) is equal to the width (w), the length in the horizontal direction may be configured to be reduced to (w/2^q).

For example, values m, n, p, and q may be predefined as various values. For example, the values m, n, p, and q may be set to integer values equal to or greater than 0. Alternatively, more specifically, they may be set as in the following examples.

1) (m, n, p, q)=(4, 4, 1, 1)
2) (m, n, p, q)=(5, 5, 1, 1)

For example, if they are predefined as the example of 1), transform coefficients may be left only for a 16×16 top left area in a 32×16 TU, and transform coefficients may be left only for a 8×8 top left area in an 8×16 TU.

In an embodiment, such a zero-out method may be applied only to a residual signal to which intra-prediction is applied, or may be applied only to a residual signal to which inter-prediction is applied, or applied to both a residual signal to which intra-prediction is applied and a residual signal to which inter-prediction is applied.

The first embodiment relating to a method of limiting a transform coefficient area when the MTS flag is 0, and the second and third embodiments relating to a method of limiting a transform coefficient area when the MTS flag is 1 may be individually applied or may be combined and applied.

In an embodiment, the following combined configurations may be applied.

1) First embodiment+Second embodiment

2) First embodiment+Third embodiment

As mentioned in the second and third embodiments, as an embodiment, the zero-out method may be applied only to a residual signal to which intra-prediction is applied, or may be applied only to a residual signal to which inter-prediction is applied, or may be applied to both a residual signal to which intra-prediction is applied and a residual signal to which inter-prediction is applied. Accordingly, the following combined configurations may be applied when the MTS flag is 1. In this instance, the first embodiment may be applied when the MTS flag is 0.

TABLE 8

| Config. index | Intra-prediction residual signal | Inter-prediction residual signal |
| --- | --- | --- |
| 1 | Zero-out is not applied | Zero-out is not applied |
| 2 | Zero-out is not applied | First embodiment |
| 3 | Zero-out is not applied | Second embodiment |
| 4 | First embodiment | Zero-out is not applied |
| 5 | First embodiment | First embodiment |
| 6 | First embodiment | Second embodiment |
| 7 | Second embodiment | Zero-out is not applied |
| 8 | Second embodiment | First embodiment |
| 9 | Second embodiment | Second embodiment |

In an embodiment of the present disclosure, the encoding apparatus 100/decoding apparatus 200 may not perform a residual coding on an area that is derived as an area having a transform coefficient of 0 according to zero-out of the above-described embodiments. That is, the encoding apparatus 100/decoding apparatus 200 may define to perform residual coding only on areas other than a zero-out area.

In the above-described first, second and third embodiments, an area (or coefficient) that can only have a value of 0 in a TU is obviously determined. That is, areas other than the top left area in which presence of transform coefficients is permitted are zero-out. Thus, in an entropy coding (or residual coding) process, the encoding apparatus 100/decoding apparatus 200 may be configured to bypass an area guaranteed to have a value of 0 without performing residual coding on the area.

In an embodiment, the encoding apparatus 100/decoding apparatus 200 may code a flag (referred to as a coded block flag (CBF)) (or a syntax or a syntax element) indicating presence or absence of a non-zero transform coefficient in a coefficient group (CG). Here, the CG is a subblock of a TU and may be configured as a 4×4 or 2×2 block depending on a shape of a TU block and/or whether the TU is a chroma/luma component.

In this instance, the encoding apparatus 100/decoding apparatus 200 may scan the inside of the corresponding CG to code coefficient values (or coefficient level values) only when the CBF is 1. Thus, the encoding apparatus 100/decoding apparatus 200 does not perform CBF coding on CGs belonging to an area zeroed out to zero and may configure so that the CGs have a value of zero by default.

In an embodiment, the encoding apparatus 100 may first code a position of a coefficient that is last located in the forward scan order (or a syntax or a syntax element indicating a position of a last significant coefficient). For example, the encoding apparatus 100 may code last_coefficient_position_x that is a horizontal position, and last_coefficient_position_y that is a vertical position. In the present disclosure, the last significant coefficient is a non-zero transform coefficient that is last disposed when transform coefficients are disposed according to the scan order from a top left position in one transform block. A position after the last significant coefficient in the scan order is filled with zero (derived to be zero).

Maximum values of available values of last_coefficient_position_x and last_coefficient_position_y may be respectively determined as (width −1) and (height −1) of a TU. However, when an area in which non-zero coefficients can be present is limited by zero-out, the maximum values of available values of last_coefficient_position_x and last_coefficient_position_y may also be limited.

Accordingly, the encoding apparatus 100/decoding apparatus 200 may limit the maximum values of available values of last_coefficient_position_x and last_coefficient_position_y in consideration of zero-out, and then code them. For example, when a binarization method applied to last_coefficient_position_x and last_coefficient_position_y is a (truncated unary (or truncated rice (TR) or truncated binary (TB)) binarization method, the encoding apparatus 100/decoding apparatus 200 may control (reduce) so that a maximum length of a truncated unary code corresponds to an adjusted maximum value (i.e., available maximum values of last_coefficient_position_x and last_coefficient_position_y).

Figure 12A:
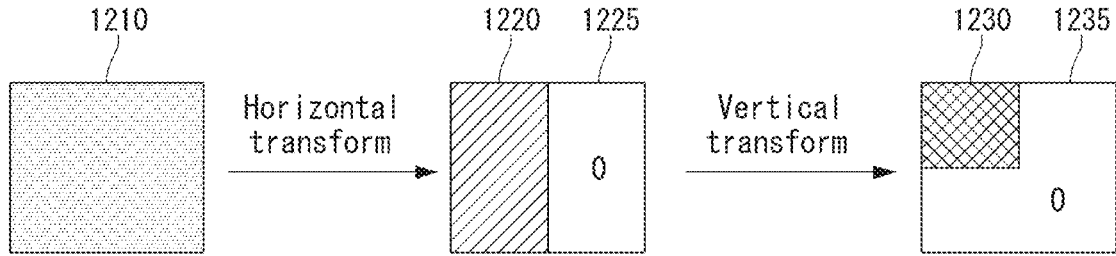
FIGS. 12a and 12b illustrate an example where a separable transform according to an embodiment of the present disclosure is applied, and more specifically.
Figure 12B:
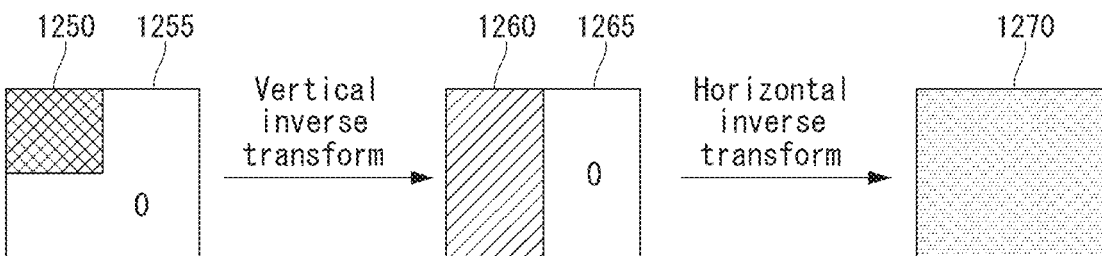

FIGS. 12a and 12b illustrate an example where a separable transform according to an embodiment of the present disclosure is applied. More specifically, FIG. 12a illustrates an area where a significant coefficient is present and an area where zero-out is applied upon forward transform (upon encoding), and FIG. 12b illustrates an area where a significant coefficient is present and an area where zero-out is applied upon inverse transform (upon decoding).

A scheme for leaving only coefficients of a low frequency area (e.g., a 16×16 top left area in a 32×32 block) for a block to which MTS is applied based on a forward transform and applying zero-out (filled with 0 or derived as 0) to a remainder may be referred to as reduced multiple transform selection (RMTS). For example, in FIG. 12a, if the size of a block 1210 including residual sample values is 32×32 and a 16×16 reduced block is output by the application of the RMTS, only coefficients (16 coefficients from the left) disposed in a left area 1220 in a row direction among coefficients generated by the application of a horizontal transform are left, and a right area 1225 is derived to have a coefficient of zero. Thereafter, only coefficients (16 coefficients from the top) disposed in a top area 1230 in a column direction among coefficients generated by the application of a vertical transform are left, and a remaining area 1235 is derived to have a coefficient of zero.

Referring to FIG. 12b, the size of a transform block 1255 including transform coefficients is 32×32, a transform is applied to a 16×16 top left area 1250 by the application of the RMTS, and a remaining area is derived to have a coefficient of zero. Since a vertical inverse transform is applied to the 16×16 area, significant coefficients are generated in a left area 1260 of the transform block, and a right area 1265 is still derived to have a coefficient of zero. Thereafter, since a horizontal inverse transform is applied to the left area 1260, significant coefficients may be present for the entire 32×32 area of the transform block.

In an embodiment of the present disclosure, there is proposed reduced 32-point MTS (RMTS32) in which a transform for high frequency coefficients is omitted. The 32-point MTS represents a method of applying a transform to a row or a column with a length of 32. The 32-point MTS can require up to 64 multiplication operations per output sample by considering the worst computational complexity, and thus the RMTS32 can reduce the computational complexity and also reduce memory usage.

According to the RMTS32, when an MTS flag is 1 (or when an MTS index is greater than 0) and a block width (height) is greater than or equal to 32, a remaining area is derived to be 0 (zero-out) while a maximum 16×16 top left area is maintained, and up to left (top) 16 coefficients are maintained. Since zero-out is independently applied in the horizontal and vertical directions, the RMTS may be applied to all block shapes. Assuming that RMTS is applied to a 32-length, a 16×16 top left area may be maintained for a 32×32 transform block, a 16×8 top left area may be maintained for a 32×8 transform block, and a 16×16 top left area may be maintained for a 16×32 transform block.

The computational complexity of 32-point MTS can be reduced to a half by using the RMTS32 from a perspective of an operation count. In this case, the 32-point MTS is a transform matrix applied to a row or a column with a length 32 of a block (when an MTS index is greater than 0 while only an MTS index is used for deriving a transform combination). Furthermore, from a perspective of memory usage, only a half the transform basis vectors of 32-point MTS matrices needs to be stored. With respect to an area derived to be zero, residual coding may be omitted because a related subblock flag is implicitly derived as 0, and a parameter for truncated unary binarization of the last coefficient position may be adjusted depending on a position at which a sufficient transform coefficient can be present.

From a perspective of memory usage, the RMTS32 proposed in this embodiment generates 16 coefficients for a row or a column with a 32-length. Hence, in 32×32 DST-7/DCT-8, only the first 16 transform basis vectors need to be stored, and the memory usage for storing 32-length DST-7/DCT-8 can be reduced to a half (e.g., from 2 KB to 1 KB).

For example, a residual coding syntax for implementing the above-described RMTS32 may be configured as in the following Table 9.

Furthermore, a non-zero width (nonZeroW) and a non-zero height (nonZeroH) of an area to which a transform is applied in a transform block may be determined as follows.

$$nonZeroW=Min(nTbW,trTypeHor==0?32:16)$$

$$nonZeroH=Min(nTbH,trTypeVer==0?32:16)$$

Here, nTbW denotes a width of a current block (transform block), nTbH denotes a height of the current block (transform block), and trTypeHor and trTypeVer denote a type of horizontal transform kernel and a type of vertical transform kernel, respectively. Min(A, B) is a function for outputting a smaller value of A and B.

For example, trTypeHor and trTypeVer may be determined as in the following Table 10 based on an MTS index (mts_idx) that is an index indicating a transform type.

TABLE 10

| mts_idx | trTypeHor | trTypeVer |
|---------|-----------|-----------|
| 0 | 0 | 0 |
| 1 | 1 | 1 |
| 2 | 2 | 1 |
| 3 | 1 | 2 |
| 4 | 2 | 2 |

Here, values of trTypeHor and trTypeVer denote one of types of transform kernel. For example, 0 may denote DCT-2, 1 may denote DST-7, and 2 may denote DCT-8. In Table 10, if mts_idx is 0, trTypeHor and trTypeVer are also determined as 0. If mts_idx is not 0 (if it is greater than 0), trTypeHor and trTypeVer are also determined as a non-zero value (greater than 0).

In other words, the non-zero width (nonZeroW) of an area to which a transform is applied may be determined as a smaller value of a width (nTbW) of a current block (transform block) and 16 if a transform index (trTypeHor) is

TABLE 9

|  | Descriptor |
|---|---|
| residual_coding( x0, y0, log2TbWidth, log2TbHeight, cIdx ) { | |
|   if( transform_skip_enabled_flag && | |
| ( cIdx != 0 \|\| tu_mts_flag[ x0 ][ y0 ] = = 0 ) && | |
|     ( log2TbWidth <= 2 ) && ( log2TbHeight <= 2 ) ) | |
|       transform_skip_flag[ x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   ...... | |
|   for( i = lastSubBlock; i >= 0; i- - ) { | |
|     ...... | |
|     if( ( i < lastSubBlock ) && ( i > 0 ) ) { | |
|       if( transform_skip_flag[ x0 ][ y0 ][ cIdx ] == 1 \|\| ( tu_mts_flag[ x0 ][ y0 ] == | |
| 0 && | |
|         ( xS << log2SbSize ) < 32 && ( yS << log2SbSize ) < 32 ) \|\| | |
|         ( tu_mts_flag[ x0 ][ y0 ] == 1 && ( cIdx != 0 \|\| ( ( xS << log2SbSize ) < | |
| 16 ) && | |
|         ( ( yS << log2SbSize ) < 16 ) ) ) ) | |
|       coded_sub_block_flag[ xS ][ yS ] | ae(v) |
|       inferSbDcSigCoeffFlag = 1 | |
|     } | |
|     ...... | |
|   } | |
|   if( tu_mts_flag[ x0 ][ y0 ] && ( cIdx = = 0 ) ) | |
|     mts_idx[ x0 ][ y0 ][ cIdx ] | ae(v) |
| } | | greater than a threshold value (e.g., 0) (i.e., if trTypeHor is not 0), and may be determined a smaller value of the width of the current block and 32 if the transform index (trType-Hor) is not greater than the threshold value (e.g., 0) (i.e., if trTypeHor is 0).

Furthermore, the non-zero height (nonZeroH) of the area to which the transform is applied may be determined as a smaller value of the height (nTbH) of the current block (transform block) and 16 if a vertical transform type index (trTypeVer) is greater than the threshold value (e.g., 0), and may be determined as a smaller value of the height (nTbH) of the current block (transform block) and 32 if the vertical transform type index (trTypeVer) is not greater than the threshold value (e.g., 0).

According to an embodiment of the present disclosure, only a half the 32-length DST-7/DCT-8 may be stored in the memory as follows.

For example, if a (horizontal or vertical) transform type index (trType) is 1 (e.g., DST-7) and the number of samples (nTbs) of a row or column of a transform target block is 32, a transform matrix may be derived as in the following Tables 11 and 12. Matrices of Tables 11 and 12 are horizontally concatenated to constitute one matrix. In [m][n], m is a transverse index, and n is a longitudinal index. If the matrix of Table 11 and the matrix of Table 12 are concatenated, a 16×32 matrix is derived, and the corresponding matrix becomes a matrix for a forward transform. An inverse transform may be performed through the matrix configured by Tables 11 and 12 and proper indexing. Furthermore, in Tables 11 and 12, the strike-out for 16 rows below means that the 16 rows are deleted because they are unnecessary by the application of a reduced transform.

TABLE 11 transMatrix[ m ][ n ] = transMatrixCol0to15[ m ][ n ] with m = 0 . . . 15, n = 0 . . . 15
transMatrixCol0to15 =

| | | | | | | | | | | | | | | | |
|---|---|---|---|---|---|---|---|---|---|---|---|---|---|---|---|
| 4 | 9 | 13 | 17 | 21 | 26 | 30 | 34 | 38 | 42 | 45 | 50 | 53 | 96 | 60 | 63 |
| 13 | 26 | 38 | 50 | 60 | 68 | 77 | 82 | 86 | 89 | 90 | 88 | 85 | 80 | 74 | 66 |
| 21 | 42 | 60 | 74 | 84 | 89 | 89 | 84 | 74 | 60 | 42 | 21 | 0 | −21 | −42 | −60 |
| 30 | 56 | 77 | 88 | 89 | 80 | 63 | 38 | 9 | −21 | −50 | −72 | −85 | −90 | −84 | −68 |
| 38 | 68 | 86 | 88 | 74 | 45 | 9 | −30 | −63 | −84 | −90 | −78 | −53 | −17 | 21 | 56 |
| 45 | 78 | 90 | 77 | 42 | −4 | −80 | −80 | −90 | −74 | −38 | 9 | 53 | 82 | 89 | 72 |
| 53 | 85 | 85 | 53 | 0 | −53 | −85 | −85 | −53 | 0 | 53 | 85 | 85 | 53 | 0 | −53 |
| 60 | 89 | 74 | 21 | −42 | −84 | −84 | −42 | 21 | 74 | 89 | 60 | 0 | −60 | −89 | −74 |
| 66 | 90 | 56 | −13 | −74 | −88 | −45 | 26 | 80 | 84 | 34 | −38 | −85 | −78 | −21 | 50 |
| 72 | 86 | 34 | −45 | −89 | −63 | 13 | 78 | 82 | 21 | −56 | −90 | −53 | 26 | 84 | 77 |
| 77 | 80 | 9 | −72 | −84 | −17 | 66 | 86 | 26 | −60 | −88 | −34 | 53 | 90 | 42 | −45 |
| 80 | 72 | −17 | −86 | −60 | 34 | 90 | 45 | −50 | −89 | −30 | 63 | 85 | 13 | −74 | −78 |
| 84 | 60 | −42 | −89 | −21 | 74 | 74 | −21 | −42 | 60 | 84 | 0 | −84 | −60 | 42 | |
| 86 | 45 | −63 | −78 | 21 | 90 | 26 | −77 | −66 | 42 | 88 | 4 | −85 | −50 | 60 | 80 |
| 88 | 30 | −78 | −56 | 60 | 77 | −34 | −88 | 4 | 89 | 26 | −80 | −53 | 63 | 74 | −38 |
| 90 | 13 | −88 | −26 | 84 | 38 | −78 | −50 | 72 | 60 | −63 | −68 | 53 | 77 | −42 | −82 |

TABLE 12 transMatrix[ m ][ n ] = transMatrixCol16to31[ m − 16 ][ n ] with m = 16 . . . 31, n = 0 . . . 15
transMatrixCol16to31 =

| | | | | | | | | | | | | | | | |
|---|---|---|---|---|---|---|---|---|---|---|---|---|---|---|---|
| 66 | 68 | 72 | 74 | 77 | 78 | 80 | 82 | 84 | 85 | 86 | 88 | 88 | 89 | 90 | 90 |
| 56 | 45 | 34 | 21 | 9 | −4 | −17 | −30 | −42 | −53 | −63 | −72 | −78 | −84 | −88 | −90 |
| −74 | −84 | −89 | −89 | −84 | −74 | −60 | −42 | −21 | 0 | 21 | 42 | 60 | 74 | 84 | 89 |
| −45 | −17 | 13 | 42 | 66 | 82 | 90 | 86 | 74 | 53 | 26 | −4 | −34 | −60 | −78 | −88 |
| 80 | 90 | 82 | 60 | 26 | −13 | −50 | −77 | −89 | −85 | −66 | −34 | 4 | 42 | 72 | 88 |
| 34 | −13 | −56 | −84 | −88 | −68 | −30 | 17 | 60 | 85 | 88 | 66 | 26 | −21 | −63 | −86 |
| −85 | −85 | −53 | 0 | 53 | 85 | 85 | 53 | 0 | −53 | −85 | −85 | −53 | 0 | 53 | 85 |
| −21 | 42 | 84 | 84 | 42 | −21 | −74 | −89 | −60 | 0 | 60 | 89 | 74 | 21 | −42 | −84 |
| 88 | 72 | 9 | −60 | −90 | −63 | 4 | 68 | 89 | 53 | −17 | −77 | −86 | −42 | 30 | 82 |
| 9 | −66 | −88 | −42 | 38 | 88 | 68 | −4 | −74 | −85 | −30 | 50 | 90 | 60 | −17 | −80 |
| −90 | −50 | 38 | 89 | 56 | −30 | −88 | −63 | 21 | 85 | 68 | −13 | −82 | −74 | 4 | 78 |
| 4 | 82 | 68 | −21 | −88 | −56 | 38 | 90 | 42 | −53 | −88 | −26 | 66 | 84 | 9 | −77 |
| 89 | 21 | −74 | −74 | 21 | 89 | 42 | −60 | −84 | 0 | 84 | 60 | −42 | −89 | −21 | 74 |
| −17 | −90 | −30 | 74 | 68 | −38 | −88 | −9 | 84 | 53 | −56 | −82 | 13 | 89 | 34 | −72 |
| −86 | 9 | 90 | 21 | −82 | −50 | 66 | 72 | −42 | −85 | 13 | 90 | 17 | −84 | −45 | 68 |
| 30 | 86 | −17 | −89 | 4 | 90 | 9 | −88 | −21 | 85 | 34 | −80 | −45 | 74 | 56 | −66 |

Furthermore, if a (horizontal or vertical) transform type index (trType) is 2 (e.g., DCT-8) and the number of samples (nTbs) of a row or column of a transform target block is 32, a transform matrix may be derived as in the following Tables 13 and 14. Matrices of Tables 13 and 14 are horizontally concatenated to constitute one matrix. In [m][n], m is a transverse index, and n is a longitudinal index. If the matrix of Table 13 and the matrix of Table 14 are concatenated, a 16×32 matrix is derived, and the corresponding matrix becomes a matrix for a forward transform. An inverse transform may be performed through the matrix configured by Tables 13 and 14 and proper indexing. Furthermore, in Tables 13 and 14, the strike-out for 16 rows below means that the 16 rows are deleted because they are unnecessary by the application of a reduced transform.

TABLE 13 transMatrix[ m ][ n ] = transMatrixCol0to15[ m ][ n ] with m = 0 . . . 15, n = 0 . . . 15
transMatrixCol0to15 =

| 90 | 90 | 89 | 88 | 88 | 86 | 85 | 84 | 82 | 80 | 78 | 77 | 74 | 72 | 68 | 66 |
| 90 | 88 | 84 | 78 | 72 | 63 | 53 | 42 | 30 | 17 | 4 | −9 | −21 | −34 | −45 | −56 |
| 89 | 84 | 74 | 60 | 42 | 21 | 0 | −21 | −42 | −60 | −74 | −84 | −89 | −89 | −84 | −74 |
| 88 | 78 | 60 | 34 | 4 | −26 | −53 | −74 | −86 | −90 | −82 | −66 | −42 | −13 | 17 | 45 |
| 88 | 72 | 42 | 4 | −34 | −66 | −85 | −89 | −77 | −50 | −13 | 26 | 60 | 82 | 90 | 80 |
| 86 | 63 | 21 | −26 | −66 | −88 | −85 | −60 | −17 | 30 | 68 | 88 | 84 | 56 | 13 | −34 |
| 85 | 53 | 0 | −53 | −85 | −85 | −53 | 0 | 53 | 85 | 85 | 53 | 0 | −53 | −85 | −85 |
| 84 | 42 | −21 | −74 | −89 | −60 | 0 | 60 | 89 | 74 | 21 | −42 | −84 | −84 | −42 | 21 |
| 82 | 30 | −42 | −86 | −77 | −17 | 53 | 89 | 68 | 4 | −63 | −90 | −60 | 9 | 72 | 88 |
| 80 | 17 | −60 | −90 | −50 | 30 | 85 | 74 | 4 | −68 | −88 | −38 | 42 | 88 | 66 | −9 |
| 78 | 4 | −74 | −82 | −13 | 68 | 85 | 21 | −63 | −88 | −30 | 56 | 89 | 38 | −50 | −90 |
| 77 | −9 | −84 | −66 | 26 | 88 | 53 | −42 | −90 | −38 | 56 | 88 | 21 | −68 | −82 | −4 |
| 74 | −21 | −89 | −42 | 60 | 84 | 0 | −84 | −60 | 42 | 89 | 21 | −74 | −74 | 21 | 89 |
| 72 | −34 | −89 | −13 | 82 | 56 | −53 | −84 | 9 | 88 | 38 | −68 | −74 | 30 | 90 | 17 |
| 68 | −45 | −84 | 17 | 90 | 13 | −85 | −42 | 72 | 66 | −50 | −82 | 21 | 90 | 9 | −86 |
| 66 | −56 | −74 | 45 | 80 | −34 | −85 | 21 | 88 | −9 | −90 | −4 | 89 | 17 | −86 | −30 |

TABLE 14 transMatrix[ m ][ n ] = transMatrixCol16to31[ m − 16 ][ n ] with m = 16 . . . 31, n = 0 . . . 15
transMatrixCol16to31 =

| 63 | 60 | 56 | 53 | 50 | 45 | 42 | 38 | 34 | 30 | 26 | 21 | 17 | 13 | 9 | 4 |
| −66 | −74 | −80 | −85 | −88 | −90 | −89 | −86 | −82 | −77 | −68 | −60 | −50 | −38 | −26 | −13 |
| −60 | −42 | −21 | 0 | 21 | 42 | 60 | 74 | 84 | 89 | 89 | 84 | 74 | 60 | 42 | 21 |
| 68 | 84 | 90 | 85 | 72 | 50 | 21 | −9 | −38 | −63 | −80 | −89 | −88 | −77 | −56 | −30 |
| 56 | 21 | −17 | −53 | −78 | −90 | −84 | −63 | −30 | 9 | 45 | 74 | 88 | 86 | 68 | 38 |
| −72 | −89 | −82 | −53 | −9 | 38 | 74 | 90 | 80 | 50 | 4 | −42 | −77 | −90 | −78 | −45 |
| −53 | 0 | 53 | 85 | 85 | 53 | 0 | −53 | −85 | −85 | −53 | 0 | 53 | 85 | 85 | 53 |
| 74 | 89 | 60 | 0 | −60 | −89 | −74 | −21 | 42 | 84 | 84 | 42 | −21 | −74 | −89 | −60 |
| 50 | −21 | −78 | −85 | −38 | 34 | 84 | 80 | 26 | −45 | −88 | −74 | −13 | 56 | 90 | 66 |
| −77 | −84 | −26 | 53 | 90 | 56 | −21 | −82 | −78 | −13 | 63 | 89 | 45 | −24 | −86 | −72 |
| −45 | 42 | 90 | 53 | −34 | −88 | −60 | 26 | 86 | 66 | −17 | −84 | −72 | 9 | 80 | 77 |
| 78 | 74 | −13 | −85 | −63 | 30 | 89 | 50 | −45 | −90 | −34 | 80 | 86 | 17 | −72 | −80 |
| 42 | −60 | −84 | 0 | 84 | 60 | −42 | −89 | −21 | 74 | 74 | −21 | −89 | −42 | 60 | 84 |
| −80 | −60 | 50 | 85 | −4 | −88 | −42 | 66 | 77 | −26 | −90 | −21 | 78 | 63 | −45 | −85 |
| −38 | 74 | 63 | −53 | −80 | 26 | 89 | 4 | −88 | −34 | 77 | 60 | −56 | −78 | 30 | 88 |
| 82 | 42 | −77 | −53 | 68 | 63 | −60 | −72 | 50 | 78 | −38 | −84 | 26 | 88 | −13 | −90 |

By constructing a transform matrix for generating an output vector including 16 sample values for an input vector including 32 residual signal samples (upon forward transform) as in Tables 11 and 12 or Tables 13 and 14 and performing an inverse transform that outputs an output vector including 32 residual signal samples for an input vector including 16 values using the matrices of Tables 11 and 12 or Tables 13 and 14 and using the indexing for an inverse transform (upon inverse transform), computational complexity and memory usage can be reduced. For example, a when a 16×32 matrix derived by concatenating Tables 11 and 12 (or Tables 13 and 14) in the horizontal direction is left as a forward transform matrix, a matrix derived by transposing the forward transform matrix is an inverse transform matrix, and therefore the decoding apparatus 200 may perform an inverse transform through the indexing corresponding to a transpose operation on each component of the forward transform matrix.

In an embodiment, information on a position of a non-zero last significant coefficient (last_sig_coeff_x_prefix, last_sig_coeff_y_prefix) may be binarized as in the following Table 15.

TABLE 15

| Syntax structure | Syntax element | Binarization | |
|---|---|---|---|
| | | Process | Input parameters |
| ...... | ...... | ...... | ...... |
| residual_coding( ) | ...... | ...... | ...... |
| | last_sig_coeff_x_prefix | TR | cMax = ( Min( log2TbWidth, ( tu_mts_flag[ x0 ][ y0 ] == 1 && cIdx == 0 ) ? 4 : 5 ) << 1 ) − 1, cRiceParam = 0 |
| | last_sig_coeff_y_prefix | TR | cMax = ( Min( log2TbHeight, ( tu_mts_flag[ x0 ][ y0 ] == 1 && cIdx == 0 ) ? 4 : 5 ) << 1 ) − 1, cRiceParam = 0 |
| | ...... | ...... | ...... |

A process of Table 15 is an item indicating a type of a binarization method, and TR represents a truncated rice (or truncated unary) binarization method. In addition, cMax and cRiceParam are parameters for determining a length of a bin string for unary binarization, and the length of the bin string may be determined as cMax>>cRiceParam.

In Table 15, information on a position of a non-zero last significant coefficient ((last_sig_coeff_x_prefix, last_sig_coeff_y_prefix) may be determined by considering whether an MTS flag (tu_mts_flag) is 1 (or whether an MTS index is greater than 0 when the MTS flag is not used) and considering information (log 2TbWidth, log 2TbHeight) related to a width of a transform block. As described above, the last significant coefficient is a non-zero coefficient last disposed in the scan order within the transform block.

In other words, an input parameter (cMax) for binarizing a prefix (last_sig_coeff_x_prefix) for a column position (x position) of the last significant coefficient may be determined based on the width (log 2TbWidth) of the transform block, and an input parameter for binarizing a prefix (last_sig_coeffy_prefix) for a row position (y position) of the last significant coefficient may be determined based on the height (log 2TbHeight) of the transform block. As an equal meaning, an input parameter (cMax) for binarizing a prefix (last_sig_coeff_x_prefix) for a column position (x position) of the last significant coefficient may be determined based on the valid width (log 2ZoTbWidth) of the transform block, and an input parameter for binarizing a prefix (last_sig_coeff_y_prefix) for a row position (y position) of the last significant coefficient may be determined based on the valid height (log 2ZoTbHeight) of the transform block. Here, the valid width (log 2ZoTbWidth) is determined as 16(4) when the width (log 2TbWidth) of the transform block is 32(5), and is determined as a smaller value of the width (log 2TbWidth) of the transform block and 32(5) when the width (log 2TbWidth) of the transform block is not 32(5). Furthermore, the valid height (log 2ZoTbHeight) is determined as 16(4) when the height (log 2TbHeight) of the transform block is 32(5), and is determined as a smaller value of the height (log 2TbHeight) of the transform block and 32(5) when the height (log 2TbHeight) of the transform block is not 32(5). In the present disclosure, the valid width refers to a width (a length from the left) of an area in which a non-zero transform coefficient may be present within the transform block, and the valid height refers to a height (a length from the top) of an area in which a non-zero transform coefficient may be present within the transform block.

Another embodiment of the present disclosure provides a method for residual coding for RMTS32. In the present embodiment, coefficients may be scanned only in an area in which non-zero coefficients may be present. In other words, a zero-out area is not scanned and may be derived to be filled with values of 0. In the zero-out case of the RMTS32, a scanned area may be a 16×16 top left area, and the same scan order as 16×16 TU may be applied to the 16×16 top left area. Furthermore, truncated unary binarization at the last coefficient position may be adjusted by considering a maximum possible position.

A residual coding syntax according to the present embodiment may be the same as the following Table 16.

TABLE 16

| | Descriptor |
|---|---|
| residual_coding( x0, y0, log2TbWidth, log2TbHeight, cIdx ) { | |
|   if( transform_skip_enabled_flag && | |
| ( cIdx ! = 0 ‖ tu_mts_flag[ x0 ][ y0 ] = = 0 ) && | |
|     ( log2TbWidth <= 2 ) && ( log2TbHeight <= 2 ) ) | |
|       transform_skip_flag[ x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2SbSize = ( Min( log2TbWidth, log2TbHeight ) < 2 ? 1 : 2 ) | |
|   numSbCoeff = 1 << ( log2SbSize << 1 ) | |
|   lastScanPos = numSbCoeff | |
|   log2TbWidth = Min( log2TbWidth, ( tu_mts_flag[ x0 ][ y0 ] = = 1 && | |
|                        cIdx == 0 ) ? 4 : 5 ) ) | |
|   log2TbHeight = Min( log2TbHeight, ( tu_mts_flag[ x0 ][ y0 ] = = 1 && | |
|                        cIdx == 0 ) ? 4 : 5 ) ) | |
|   lastSubBlock = ( 1 << ( log2TbWidth + log2TbHeight − 2 * log2SbSize ) ) − 1 | |
|   do { | |
|     if( lastScanPos = = 0 ) { | |

TABLE 16-continued

|  | Descriptor |
|---|---|

```
            lastScanPos = numSbCoeff
            lastSubBlock– –
        }
        lastScanPos– –
        xS = DiagScanOrder[ log2TbWidth – log2SbSize ][ log2TbHeight – log2SbSize ]
                          [ lastSubBlock ][ 0 ]
        yS = DiagScanOrder[ log2TbWidth – log2SbSize ][ log2TbHeight – log2SbSize ]
                          [ lastSubBlock ][ 1 ]
        xC = ( xS << log2SbSize ) +
                DiagScanOrder[ log2SbSize ][ log2SbSize ][ lastScanPos ][ 0 ]
        yC = ( yS << log2SbSize ) +
                DiagScanOrder[ log2SbSize ][ log2SbSize ][ lastScanPos ][ 1 ]
    } while( ( xC != LastSignificantCoeffX ) || ( yC != LastSignifi-
cantCoeffY ) )
    numSigCoeff = 0
    QState = 0
    for( i = lastSubBlock; i >= 0; i– – ) {
        startQStateSb = QState
        xS = DiagScanOrder[ log2TbWidth – log2SbSize ][ log2TbHeight – log2SbSize ]
                          [ lastSubBlock ][ 0 ]
        yS = DiagScanOrder[ log2TbWidth – log2SbSize ][ log2TbHeight – log2SbSize ]
                          [ lastSubBlock ][ 1 ]
        inferSbDcSigCoeffFlag = 0
        if( ( i < lastSubBlock ) && ( i > 0 ) ) {
            coded_sub_block_flag[ xS ][ yS ]                              ae(v)
            inferSbDcSigCoeffFlag = 1
        }
        firstSigScanPosSb = numSbCocff
        lastSigScanPosSb = –1
        remBinsPass1 = ( log2SbSize < 2 ? 6 : 28 )
        remBinsPass2 = ( log2SbSize < 2 ? 2 : 4 )
        firstPosMode0 = ( i = = lastSubBlock ? lastScanPos – 1 : numSbCoeff – 1 )
        firstPosMode1 = –1
        firstPosMode2 = –1
        for( n = ( i = = firstPosMode0; n >= 0 && remBinsPass1 >= 3; n– – )
{
            xC = ( xS << log2SbSize ) + DiagSca-
nOrder[ log2SbSize ][ log2SbSize ][ n ][ 0 ]
            yC = ( yS << log2SbSize ) + DiagSca-
nOrder[ log2SbSize ][ log2SbSize ][ n ][ 1 ]
            if( coded_sub_block_flag[ xS ][ yS ] && ( n > 0 || !inferSbDcSigCoef-
fFlag ) ) {
                sig_coeff_flag[ xC ][ yC ]                              ae(v)
                remBinsPass1– –
                if( sig_coeff_flag[ xC ][ yC ] )
                    inferSbDcSigCoeffFlag = 0
            }
            if( sig_coeff_flag[ xC ][ yC ] ) {
                numSigCoeff++
                abs_level_gt1_flag[ n ]                                 ae(v)
                remBinsPass1– –
                if( abs_level_gt1_flag[ n ] ) {
                    par_level_flag[ n ]                                 ae(v)
                    remBinsPass1– –
                    if( remBinsPass2 > 0 ) {
                        remBinsPass2– –
                        if( remBinsPass2 = = 0 )
                            firstPosMode1 = n – 1
                    }
                }
                if( lastSigScanPosSb = = –1 )
                    lastSigScanPosSb = n
                firstSigScanPosSb = n
            }
            AbsLevelPass1[ xC ][ yC ] =
                    sig_coeff_flag[ xC ][ yC ] + par_level_flag[ n ] + abs_level_gt1_flag[ n ]
            if( dep_quant_enabled_flag )
                QState = QStateTransTable[ QState ][ AbsLevelPass1[ xC ][ yC ] & 1 ]
            if( remBinsPass1 < 3 )
                firstPosMode2 = n – 1
        }
        if( firstPosMode1 < firstPosMode2 )
            firstPosMode1 = firstPosMode2
        for( n = numSbCoeff – 1; n >= firstPosMode2; n– – )
            if( abs_level_gt1_flag[ n ] )
                abs_level_gt3_flag[ n ]                                  ae(v)
        for( n = numSbCoeff – 1; n >= firstPosMode1; n– – ) {
            xC = ( xS << log2SbSize ) + DiagSca-
```

TABLE 16-continued

| | Descriptor |
|---|---|

```
nOrder[ log2SbSize ][ log2SbSize ][ n ][ 0 ]
        yC = ( yS << log2SbSize ) + DiagSca-
nOrder[ log2SbSize ][ log2SbSize ][ n ][ 1 ]
        if( abs_level_gt3_flag[ n ] )
            abs_remainder[ n ]                                              ae(v)
        AbsLevel[ xC ][ yC ] = AbsLevelPass1[ xC ][ yC ] +
                                2 * ( abs_level_gt3_flag[ n ] + abs_remain-
der[ n ] )
    }
    for( n = firstPosMode1; n > firstPosMode2; n− − ) {
        xC = ( xS << log2SbSize ) + DiagSca-
nOrder[ log2SbSize ][ log2SbSize ][ n ][ 0 ]
        yC = ( yS << log2SbSize ) + DiagSca-
nOrder[ log2SbSize ][ log2SbSize ][ n ][ 1 ]
        if( abs_level_gt1_flag[ n ] )
            abs_remainder[ n ]                                              ae(v)
        AbsLevel[ xC ][ yC ] = AbsLevelPass1[ xC ][ yC ] + 2 * abs_remainder[ n ]
    }
    for( n = firstPosMode2; n >= 0; n− − ) {
        xC = ( xS << log2SbSize ) + DiagSca-
nOrder[ log2SbSize ][ log2SbSize ][ n ][ 0 ]
        yC = ( yS << log2SbSize ) + DiagSca-
nOrder[ log2SbSize ][ log2SbSize ][ n ][ 1 ]
        dec_abs_level[ n ]                                                  ae(v)
        if(AbsLevel[ xC ][ yC ] > 0 )
            firstSigScanPosSb = n
        if( dep_quant_enabled_flag )
            QState = QStateTransTable[ QState ][ AbsLevel[ xC ][ yC ] & 1 ]
    }
    if( dep_quant_enabled_flag || !sign_data_hiding_enabled_flag )
        signHidden = 0
    else
        signHidden = ( lastSigScanPosSb − firstSigScanPosSb > 3 ? 1 : 0 )
    for( n = numSbCoeff − 1; n >= 0; n− − ) {
        xC = ( xS << log2SbSize ) + DiagSca-
nOrder[ log2SbSize ][ log2SbSize ][ n ][ 0 ]
        yC = ( yS << log2SbSize ) + DiagSca-
nOrder[ log2SbSize ][ log2SbSize ][ n ][ 1 ]
        if( sig_coeff_flag[ xC ][ yC ] &&
            ( !signHidden || ( n != firstSigScanPosSb ) ) )
            coeff_sign_flag[ n ]                                            ae(v)
    }
    if( dep_quant_enabled_flag ) {
        QState = startQStateSb
        for( n = numSbCoeff − 1; n >= 0; n− − ) {
            xC = ( xS << log2SbSize ) +
                    DiagScanOrder[ log2SbSize ][ log2SbSize ][ n ][ 0 ]
            yC = ( yS << log2SbSize ) +
                    DiagScanOrder[ log2SbSize ][ log2SbSize ][ n ][ 1 ]
            if( sig_coeff_flag[ xC ][ yC ] )
                TransCoeffLevel[ x0 ][ y0 ][ cIdx ][ xC ][ yC ] =
                        ( 2 * AbsLevel[ xC ][ yC ] − ( QState > 1 ? 1 : 0 ) ) *
                        ( 1 − 2 * coeff_sign_flag[ n ] )
            QState = QStateTransTable[ QState ][ par_level_flag[ n ] ]
        }
    } else {
        sumAbsLevel = 0
        for( n = numSbCoeff − 1; n >= 0; n− − ) {
            xC = ( xS << log2SbSize ) +
                    DiagScanOrder[ log2SbSize ][ log2SbSize ][ n ][ 0 ]
            yC = ( yS << log2SbSize ) +
                    DiagScanOrder[ log2SbSize ][ log2SbSize ][ n ][ 1 ]
            if( sig_coeff_flag[ xC ][ yC ] ) {
                TransCoeffLevel[ x0 ][ y0 ][ cIdx ][ xC ][ yC ] =
                        AbsLevel[ xC ][ yC ] * ( 1 − 2 * coeff_sign_flag[ n ] )
                if( signHidden ) {
                    sumAbsLevel += AbsLevel[ xC ][ yC ]
                    if( ( n = = firstSigScanPosSb ) && ( sumAbsLevel % 2 ) = =
1 ) )
                        TransCoeffLevel[ x0 ][ y0 ][ cIdx ][ xC ][ yC ] =
                                −TransCoeffLevel[ x0 ][ y0 ][ cIdx ][ xC ][ yC ]
                }
            }
        }
    }
}
```

TABLE 16-continued

| | Descriptor |
|---|---|
| if( tu_mts_flag[ x0 ][ y0 ] && ( cIdx = = 0 ) )<br>    mts_idx[ x0 ][ y0 ][ cIdx ]<br>} | ae(v) |

In Table 16, last_sig_coeff_x_prefix and last_sig_coeff_y_prefix that are syntax elements related to the position of the last significant coefficient may be defined as follows.

last_sig_coeff_x_prefix denotes a prefix for a column position of the last significant coefficient according to the scan order within the transform block. Array indexes x0 and y0 denote a position (x0, y0) of a top left sample of the transform block for a top left sample of a picture. An array index cIdx denotes an indicator for a chroma component, and may be set to 0 for a luma, 1 for Cb, and 2 for Cr. Values of last_sig_coeff_x_prefix may be values within a range from zero to (Min(log 2TbWidth, (tu_mts_flag[x0][y0]==1 && cIdx==0) ?4:5))<<1)−1.

In other words, a maximum value of last_sig_coeff_x_prefix may be (Min(log 2TbWidth, (tu_mts_flag[x0][y0]==1 && cIdx==0) ?4:5))<<1)−1, where log 2TbWidth is a value that takes a log with a base of 2 in the width of the transform block, and tu_mts_flag represents whether MTS is applied to the transform block. If Tu_mts_flag is 1, DST-7 or DCT-8 may be applied to the transform block in the horizontal and vertical directions. tu_mts_flag[x0][y0]==1 may be replaced by mts_idx[x0][y0]>0 only when only mts_idx is used. Further, Min(A, B) is a function for outputting a smaller value of A and B.

That is, if MTS is not applied (if tu_mts_flag is 0), a maximum value of last_sig_coeff_x_prefix is determined based on a smaller value of log 2TbWidth and 5. If MTS is applied (if tu_mts_flag is not 0), a maximum value of last_sig_coeff_x_prefix is determined based on a smaller value of log 2TbWidth and 4. In other words, if MTS is applied to a luma block and the width of the transform block is 32 (if log 2TbWidth is 5 and a transform is applied to a partial area), a maximum value of last_sig_coeff_x_prefix is determined as (4<<1)−1=7.

In other words, a prefix (last_sig_coeff_x_prefix) for a row position of the last significant coefficient according to scan order within a transform block may be determined based the valid width (log 2ZoTbWidth) of the transform block, where when MTS is applied (when mts_flag is not 0 or when mts_idx is greater than zero while only mts_idx is used), the valid width (log 2ZoTbWidth) is determined as 16 (log 2ZoTbWidth is 4) if the width of the transform block is 32 (if log 2TbWidth is 5 and a transform is applied to a partial area), and the valid width (log 2ZoTbWidth) is determined as a smaller value (a smaller value of (log 2TbWidth and 5) of the width of the transform block and 32 if the width of the transform block is not 32.

last_sig_coeff_y_prefix denotes a prefix for a row position of the last significant coefficient according to scan order within a transform block. Array indexes x0 and y0 denote a position (x0, y0) of a top left sample of a transform block for a top left sample of a picture. An array index cIdx denotes an indicator for a chroma component, and may be set as 0 for a luma, 1 for Cb, and 2 for Cr. Values of last_sig_coeff_fy_prefix may be values within a range from zero to (Min(log 2TbHeight, (tu_mts_flag[x0][y0]==1 && cIdx==0) ? 4:5))<<1)−1.

Similar to last_sig_coeff_x_prefix, a maximum value of last_sig_coeff_y_prefix may be (Min(log 2TbHeight, (tu_mts_flag[x0][y0]==1 && cIdx==0) ?4:5))<<1)−1, where log 2TbHeight denotes a value that takes a log with a base of 2 in the height of the transform block.

That is, if MTS is not applied (if tu_mts_flag is 0), a maximum value of last_sig_coeff_y_prefix is determined based on a smaller value of log 2TbHeight and 5. If MTS is applied (if tu_mts_flag is not 0), a maximum value of last_sig_coeffy_prefix is determined based on a smaller value of log 2TbHeight and 4. In other words, if MTS is applied and the height of the transform block is 32 (if log 2TbHeight is 5), a maximum value of last_sig_coeff_y_prefix is determined as (4<<1)−1=7.

In other words, a prefix (last_sig_coeff_y_prefix) for a column position of the last significant coefficient according to scan order within the transform block may be determined based on the valid height of the transform block, where when MTS is applied (when mts_flag is not 0 or when mts_idx is greater than 1 while only mts_idx is used), the valid height is determined as 16 (log 2ZoTbHeight is 4) if the height of the transform block is 32 (if log 2TbHeight is 5), and the valid width (log 2ZoTbWidth) is determined as a smaller value (a smaller value of log 2TbHeight and 5) of the height of the transform block and 32 if the height of the transform block is not 32.

A position of the last significant coefficient within the transform block may be derived using last_sig_coeff_x_prefix and last_sig_coeff_y_prefix derived as described above. Scanning or a transform may be performed on the transform block based on the position of the last significant coefficient.

Furthermore, a suffix for determining the position of the last significant coefficient may be additionally used. Referring to Table 16, if last_sig_coeff_x_prefix is greater than a threshold value 3, a suffix (last_sig_coeff_x_suffix) related to a column position of the last significant coefficient may be obtained. Furthermore, if last_sig_coeff_y_prefix is greater than the threshold value 3, a suffix (last_sig_coeff_y_suffix) related to a row position of the last significant coefficient may be obtained. If last_sig_coeff_x_suffix is present, a column position (LastSignificantCoeffX) of the last significant coefficient may be determined based on last_sig_coeff_x_prefix and last_sig_coeff_x_suffix. Further, if last_sig_coeff_y_suffix is present, a column position (LastSignificantCoeffY) of the last significant coefficient may be determined based on last_sig_coeff_y_prefix and last_sig_coeff_y_suffix.

Some of the embodiments of the present disclosure described above may be distinguished and described for convenience of explanation, but the present disclosure is not limited thereto. That is, the above-described embodiments may be independently performed, and one or more embodiments may be combined and performed.

The RMTS32 proposed above may be applied to both a case where the MTS technology is applied and a case where 32-point DST-7 or 32-point DCT-8 is applied. For example, a transform may be applied as illustrated in FIGS. 13a to 18d.

As illustrated in FIGS. 13a to 18d, DST-7 or DCT-8 may be applied to components of each subblock, but transform pairs applied in the horizontal direction and the vertical direction are not limited to examples of FIGS. 13a to 18d. For example, various transform pairs may be applied. For example, a transform pair applied to each subblock may be indicated by an index (e.g., MTS index), and may be implicitly determined depending on a split type of a block and a position of a subblock to which a transform is applied.

In FIGS. 13a to 18d, a width and a height of a block (e.g., coding unit) are denoted by w and h, respectively. When a width and a height of a subblock to which an actually separable transform is applied is expressed as a pair of (width, height), a transform may be applied to a subblock with sizes of (w1, h), (w−w1, h), (w, h1), and (w, h−h1), where w1 may be 1/4, 1/2, 3/4, or p/m of w, and h1 may be 1/4, 1/2, 3/4, or q/n of h.

A subblock to which a transform is applied may be positioned at the left or right side of the entire block when a block is split in in the vertical direction as illustrated in FIGS. 13a and 13b or FIGS. 15a and 15b, and may be positioned at the upper or lower side of the entire block as illustrated in FIGS. 14a and 14b or FIGS. 16a and 16b. As illustrated in FIGS. 13a to 18d, the transform on a per subblock basis may be applied to a residual signal of a block to which inter-prediction is applied.

A flag (sub-block transform (SBT) flag) for indicating whether to apply a transform to one-side subblock generated by splitting a block including the corresponding residual signal may be signaled. If the SBT flag is 1, the block is split into a plurality of subblocks, and then a transform is performed. If the SBT flag is 0, the block is not additionally split. In the present disclosure, the SBT represents a method of applying a transform to one subblock (one transform unit) of subblocks (transform units) split from a coding unit.

If the SBT flag is 1, a flag (SBT horizontal flag) indicating a split direction (vertical direction or horizontal direction) of the block may be signaled. Here, if the SBT horizontal flag is 0, the block may be split in the vertical direction as illustrated in FIG. 13a or 13b, and if the SBT horizontal flag is 1, the block may be split in the horizontal direction as illustrated in FIG. 14a or 14b.

Further, if the SBT flag is 1, a flag (SBT position flag) indicating a position of a subblock, to which a transform is actually applied, among subblocks split from an original block may be signaled. For example, it may be configured so that a transform is applied to a first subblock (left or upper subblock) if the SBT position flag is 0, and a transform is applied to a second subblock (right or lower subblock) if the SBT position flag is 1.

The block may be split based on 1/2 or 1/4 of the width w or the height h. A flag (SBT quad flag) indicating that the block is split based on which position of the width or the height may be signaled. If the SBT quad flag is 0, the block may be split based on 1/2 of the width or the height as illustrated in FIGS. 13a and 13b or FIGS. 14a and 14b, and if the SBT quad flag is 1, the block may be split based on 1/4 of the width or the height as illustrated in FIGS. 15a and 15b or FIGS. 16a and 16b.

Figure 13A:
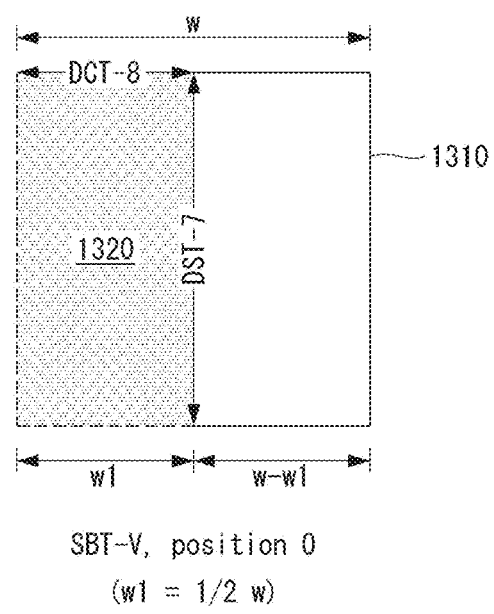
FIGS. 13a and 13b illustrate an example of a transform for subblocks of a block, to which a symmetric vertical split is applied, according to an embodiment of the present disclosure.
Figure 13B:
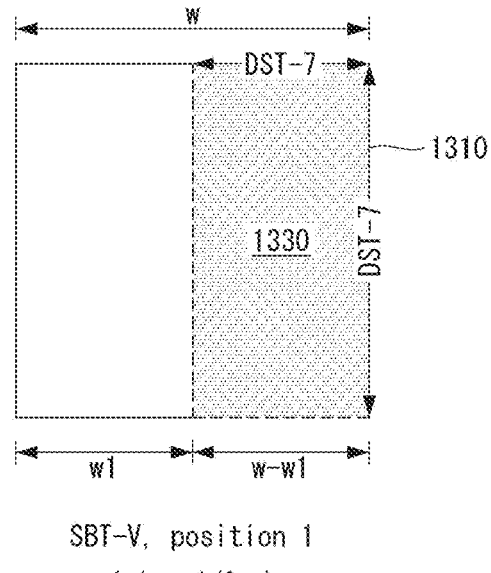
Figure 14A:
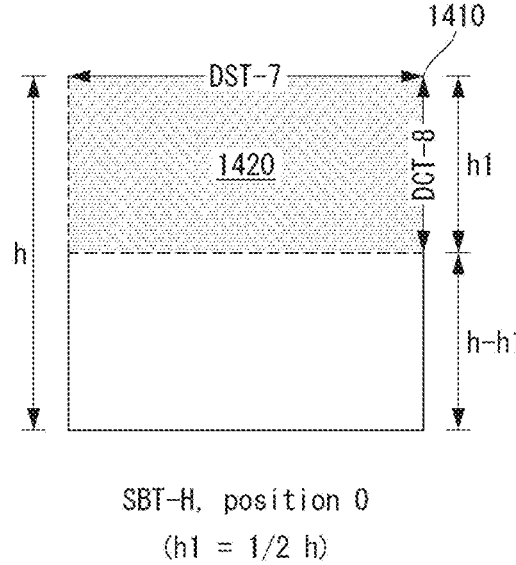
FIGS. 14a and 14b illustrate an example of a transform for subblocks of a block, to which a symmetric horizontal split is applied, according to an embodiment of the present disclosure.
Figure 14B:
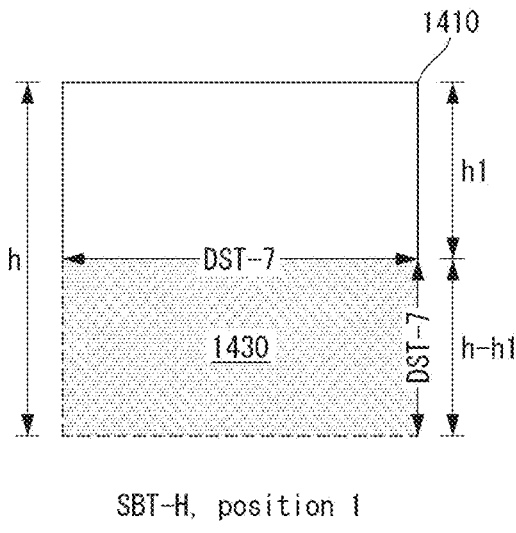

FIGS. 13a and 13b illustrate an example of a transform for subblocks of a block, to which a symmetric vertical split is applied, according to an embodiment of the present disclosure. If a flag (SBT horizontal flag) indicating a split direction of a block 1310 is 0, the block 1310 may be split in the vertical direction as illustrated in FIGS. 13a and 13b. In FIGS. 13a and 13b, the block (e.g., coding unit) 1310 is split into a first subblock 1320 positioned at the left side and a second subblock 1330 positioned at the right side along a vertical direction boundary. If the flag (SBT horizontal flag) indicating the split direction of the block 1310 is 0, as illustrated in FIGS. 13a and 13b, when a width of the block 1310 is w, the block 1310 may be split into the first subblock 1320 and the second subblock 1330 based on 1/2 (w1=1/2*w) of the width w.

When the block 1310 has been split as illustrated in FIGS. 13a and 13b, a subblock, to which a transform is applied, among the subblocks 1320 and 1330 may be determined based on a flag (SBT position flag) indicating a subblock, to which the transform is applied. If the SBT position flag is 0, as illustrated in FIG. 13a, a transform may be applied to the first subblock 1320 positioned at the left side. In addition, if the SBT position flag is 1, as illustrated in FIG. 13b, a transform may be applied to the second subblock 1330 positioned at the right side.

FIGS. 14a and 14b illustrate an example of a transform for subblocks of a block, to which a symmetric horizontal split is applied, according to an embodiment of the present disclosure. If a flag (SBT horizontal flag) indicating a split direction of a block 1410 is 0, the block 1410 may be split in the horizontal direction as illustrated in FIGS. 14a and 14b. In FIGS. 14a and 14b, the block (e.g., coding unit) 1410 is split into a first subblock 1420 positioned at the upper side and a second subblock 1430 positioned at the lower side along a horizontal direction boundary. If the flag (SBT horizontal flag) indicating the split direction of the block 1410 is 1, as illustrated in FIGS. 14a and 14b, when a height of the block 1410 is h, the block 1410 may be split into the first subblock 1420 and the second subblock 1430 based on 1/2 (h1=1/2*h) of the height h.

When the block 1410 has been split as illustrated in FIGS. 14a and 14b, a subblock, to which a transform is applied, among the subblocks 1420 and 1430 may be determined based on a flag (SBT position flag) indicating a subblock, to which the transform is applied. If the SBT position flag is 0, as illustrated in FIG. 14a, a transform may be applied to the first subblock 1420 positioned at the upper side. In addition, if the SBT position flag is 1, as illustrated in FIG. 14b, a transform may be applied to the second subblock 1430 positioned at the lower side.

Figure 15A:
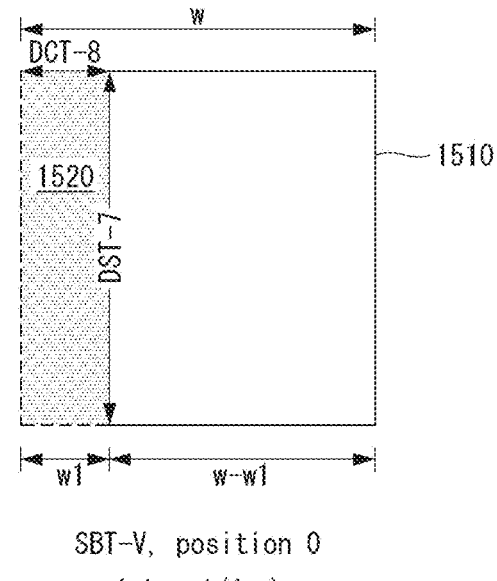
FIGS. 15a and 15b illustrate an example of a transform for subblocks of a block, to which an asymmetric vertical split is applied, according to an embodiment of the present disclosure.
Figure 15B:
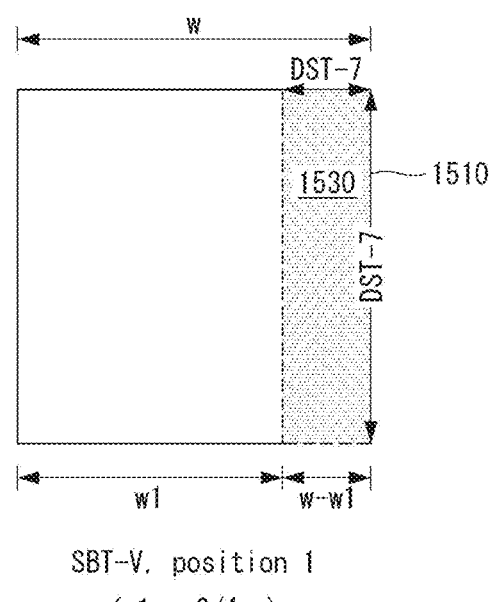

FIGS. 15a and 15b illustrate an example of a transform for subblocks of a block, to which an asymmetric vertical split is applied, according to an embodiment of the present disclosure. If a flag (SBT horizontal flag) indicating a split direction of a block 1510 is 0, the block 1510 may be split in the vertical direction as illustrated in FIGS. 15a and 15b. In FIGS. 15a and 15b, the block (e.g., coding unit) 1510 may be split into a left subblock and a right subblock based on a vertical direction boundary. As illustrated in FIG. 15a, when a width of the block 1510 is w, the block 1510 may be split based on 1/4 (w1=1/4*w) of the width w, and a transform may be applied to a first subblock 1520 that is an area corresponding to 1/4 of the width w from the left. Alternatively, as illustrated in FIG. 15b, when a width of the block 1510 is w, the block 1510 may be split based on 3/4 (w1=3/4*w) of the width w, and a transform may be applied to a second subblock 1530 that is an area corresponding to 1/4 of the width w from the right.

When the block 1510 has been split as illustrated in FIGS. 15a and 15b, a subblock, to which a transform is applied, among the subblocks 1520 and 1530 may be determined based on a flag (SBT position flag) indicating a subblock, to which the transform is applied. If the SBT position flag is 0, as illustrated in FIG. 15a, a transform may be applied to the first subblock 1520 corresponding to the left quarter area. In addition, if the SBT position flag is 1, as illustrated in FIG. 15b, a transform may be applied to the second subblock 1530 corresponding to the right quarter area.

Figure 16A:
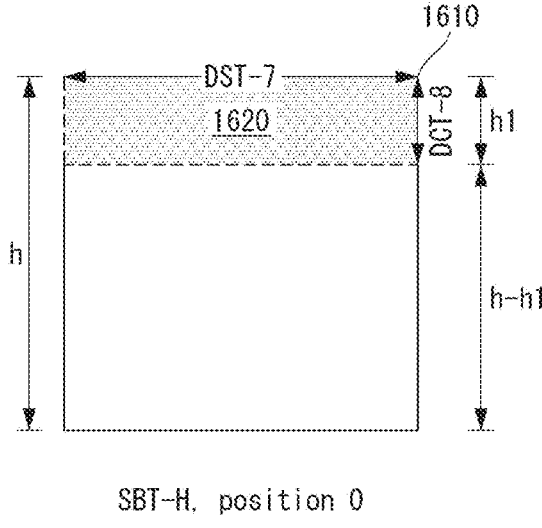
FIGS. 16a and 16b illustrate an example of a transform for subblocks of a block, to which an asymmetric horizontal split is applied, according to an embodiment of the present disclosure.
Figure 16B:
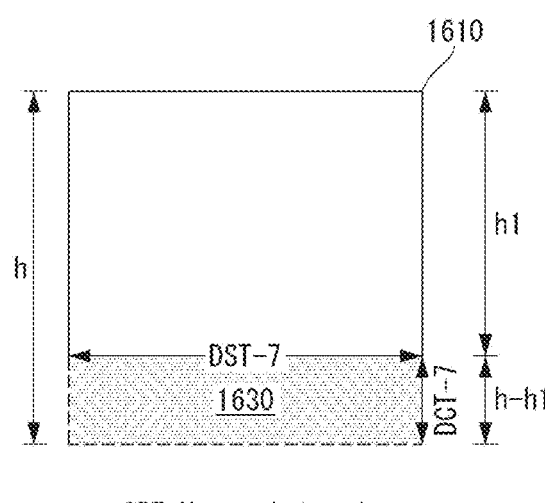

FIGS. 16a and 16b illustrate an example of a transform for subblocks of a block, to which an asymmetric horizontal split is applied, according to an embodiment of the present disclosure. If a flag (SBT horizontal flag) indicating a split direction of a block 1610 is 0, the block 1610 may be split in the horizontal direction as illustrated in FIGS. 16a and 16b. In FIGS. 16a and 16b, the block (e.g., coding unit) 1610 may be split into an upper subblock and a lower subblock based on a horizontal direction boundary. As illustrated in FIG. 16a, when a height of the block 1610 is h, the block 1610 may be split based on ¼ (h1=¼ *h) of the height h, and a transform may be applied to a first subblock 1620 that is an area corresponding to ¼ of the height h from the top. Alternatively, as illustrated in FIG. 16b, when a height of the block 1610 is h, the block 1610 may be split based on ¾ (h1=¾ *h) of the height h, and a transform may be applied to a second subblock 1630 that is an area corresponding to ¼ of the height h from the bottom.

When the block 1610 has been split as illustrated in FIGS. 16a and 16b, a subblock, to which a transform is applied, among the subblocks 1620 and 1630 may be determined based on a flag (SBT position flag) indicating a subblock, to which the transform is applied. If the SBT position flag is 0, as illustrated in FIG. 16a, a transform may be applied to the first subblock 1620 corresponding to the upper quarter area. In addition, if the SBT position flag is 1, as illustrated in FIG. 16b, a transform may be applied to the second subblock 1630 corresponding to the lower quarter area.

As illustrated in FIGS. 13a to 18d, if a horizontal transform and a vertical transform for a specific block is determined (without designating the horizontal transform and the vertical transform via MTS signaling), the above-described RMTS32 may be applied when the width or the height of the block is 32. That is, as illustrated in FIGS. 13a to 18d, if SBT is applied, DST-7 or DCT-8 may be used as a transform kernel for the horizontal transform and the vertical transform. If the RMTS32 is applied, residual coding may be omitted in an area to which zero-out is applied. Alternatively, scanning and residual coding may be applied only to a non-zero-out area. As illustrated in FIGS. 17a to 17d, each of subblocks according to a symmetric split for a residual block has (width, height) of (w/2, h) or (w, h/2), and zero-out may be applied to a subblock having a side equal to or greater than a threshold length (e.g., 32). As illustrated in FIGS. 18a to 18d, each of subblocks according to an asymmetric split for a residual block has (width, height) of (w/4, h) or (w, h/4), and zero-out may be applied to a subblock having a side equal to or greater than a threshold length (e.g., 16).

Figure 17A:
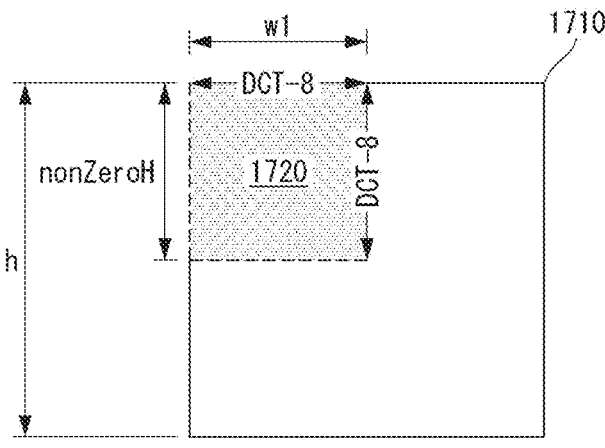
FIGS. 17a to 17d illustrate examples of transforms to which zero-out is applied in subblocks of a block, to which a symmetric split is applied, according to an embodiment of the present disclosure.
Figure 17B:
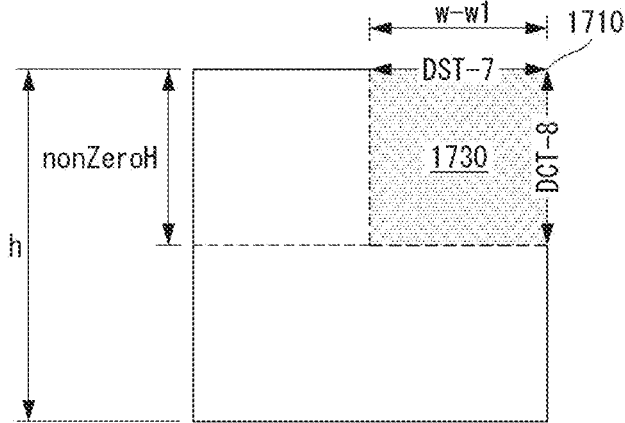
Figure 17C:
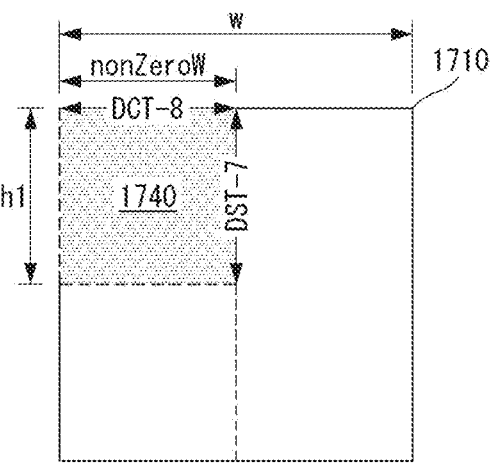
Figure 17D:
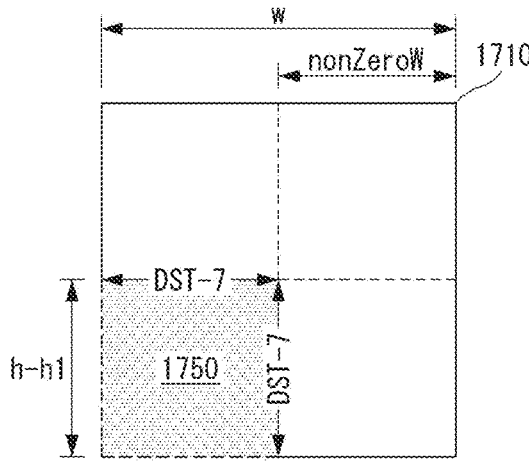

In FIGS. 17a to 17d, if a block is split symmetrically and a width w or a height h is greater than or equal to a predefined first length (e.g., 32), a width nonZeroW or a height nonZeroH of a transform target area is reduced to a second length (e.g., 16) less than the first length. For example, if a block 1710 is split into a left subblock and a right subblock based on a vertical direction boundary, an upper area 1720 of the left subblock as illustrated in FIG. 17a or an upper area 1730 of the right subblock as illustrated in FIG. 17b may be determined as the transform target area. Further, if the block 1710 is split into an upper subblock and a lower subblock based on a horizontal direction boundary, a left area 1740 of the upper subblock as illustrated in FIG. 17c or a left area 1750 of the lower subblock as illustrated in FIG. 17d may be determined as the transform target area.

In the present disclosure, the transform target area is an area in which a non-zero transform coefficient may be present when (inverse) transform is performed by a decoder, and may be replaced by an inverse transform target area.

Figure 18A:
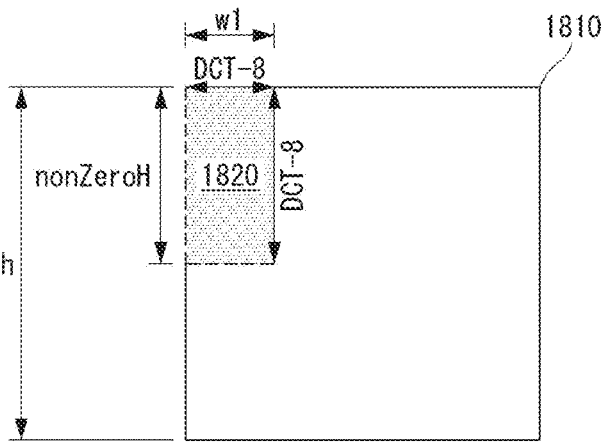
FIGS. 18a to 18d illustrate examples of transforms to which zero-out is applied in subblocks of a block, to which an asymmetric split is applied, according to an embodiment of the present disclosure.
Figure 18B:
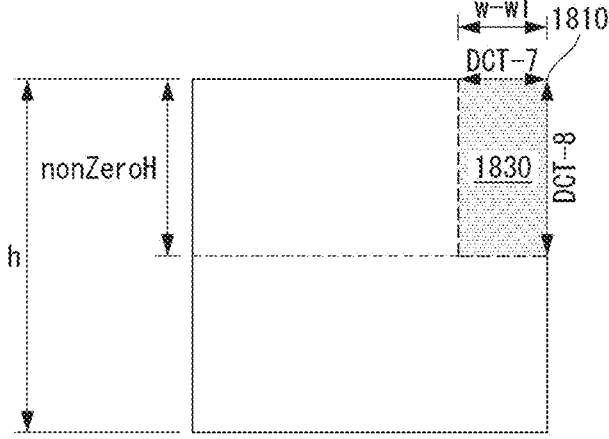
Figure 18C:
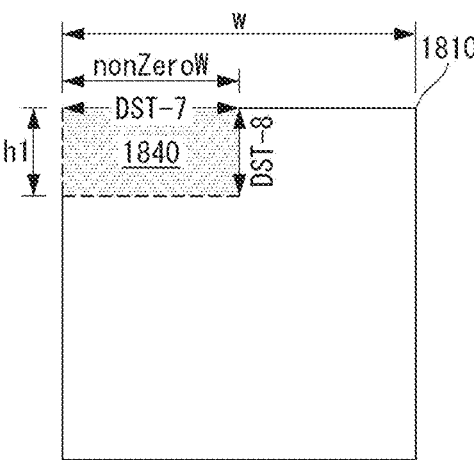
Figure 18D:
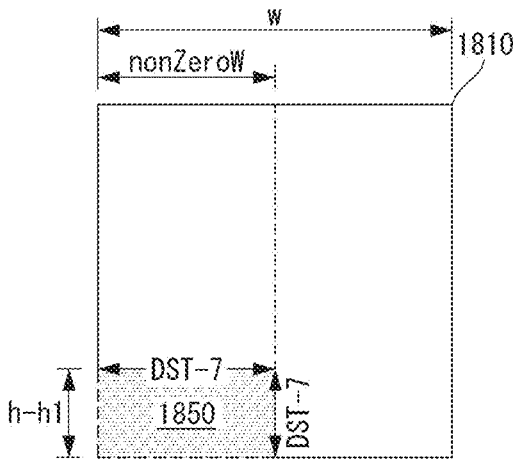

In FIGS. 18a to 18d in the same manner as FIGS. 15a and 15b, if a block is split in the vertical direction at ¼ or ¾ of a width w and the width w or a height h is greater than or equal to a predefined first length (e.g., 32), a width nonZeroW or a height nonZeroH of a transform target area is reduced to a second length (e.g., 16) less than the first length. For example, as illustrated in FIG. 18a, if a block 1810 is split based on ¼ (w1=¼*w) of the width w, an upper area 1820 of a left quarter area may be determined as the transform target area. As illustrated in FIG. 18b, if the block 1810 is split based on ¾ (w1=¾*w) of the width w, an upper area 1830 of a right quarter area may be determined as the transform target area. As illustrated in FIG. 18c, if the block 1810 is split based on ¼ (h1=¼*h) of the height h, a left area 1840 of an upper quarter area may be determined as the transform target area. As illustrated in FIG. 18d, if the block 1810 is split based on ¾ (h1=¾*h) of the height h, a left area 1850 of a lower quarter area may be determined as the transform target area.

Figure 19:
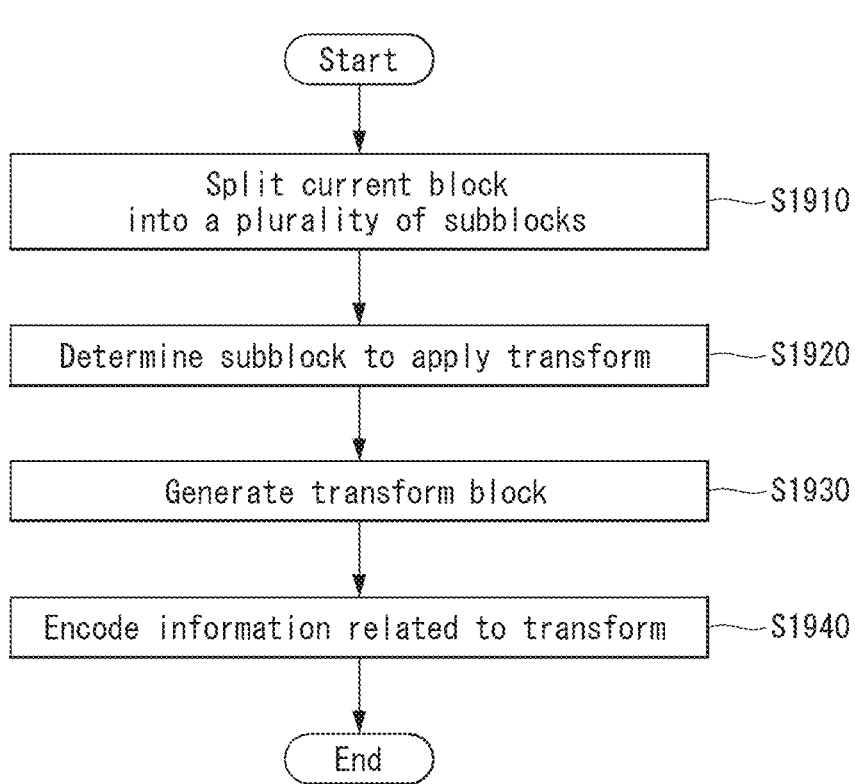
FIG. 19 illustrates an example of a flow chart for encoding a video signal according to an embodiment of the present disclosure.

FIG. 19 illustrates an example of a method for encoding a video signal according to an embodiment of the present disclosure. In step S1910, the encoding apparatus 100 splits a current block including residual samples into a plurality of subblocks. For example, the encoding apparatus 100 may split a residual block including residual samples obtained by subtracting a prediction sample value from samples of an original block, into two or more subblocks. In this instance, the encoding apparatus 100 may determine a split direction (horizontal direction or vertical direction) of a block and a split type (symmetric split and asymmetric split) of the block in consideration of the RD cost.

In step S1920, the encoding apparatus 100 determines a subblock to apply a transform from among the plurality of split subblocks. The encoding apparatus 100 may select a subblock to apply a transform from among the plurality of split subblocks in consideration of the RD cost.

In step S1930, the encoding apparatus 100 generates a transform block including transform coefficients by applying a horizontal transform and a vertical transform to the determined subblock.

Here, an area in which a non-zero transform coefficient is present in the transform block may correspond to a reduced area less than a subblock. A size (width, height) of the area (transform target area from a decoder perspective) in which the non-zero transform coefficient is present may be determined based on a transform type applied to the subblock and a size (width, height) of the subblock.

For example, a width nonZeroW of the area in which the non-zero transform coefficient is present in the transform block may be determined based on a type trTypeHor of a horizontal transform and a width nTbW of the subblock, and a height nonZeroH of the area in which the non-zero transform coefficient is present in the transform block may be determined based on a type trTypeVer of a vertical transform and a height nTbH of the subblock. For example, if the type trTypeHor of the horizontal transform corresponds to DST-7 or DCT-8 and the width nTbW of the subblock is greater than or equal to a first length (e.g., 32), the width nonZeroW of the area in which the non-zero transform coefficient is present in the transform block may be determined as a second length (e.g., 16) less than the first length. Further, if the type trTypeVer of the vertical transform corresponds to DST-7 or DCT-8 and the height nTbH of the subblock is greater than or equal to the first length (e.g., 32), the height nonZeroH of the area in which the non-zero transform coefficient is present in the transform block may be determined as the second length (e.g., 16) less than the first length. A remaining area excluding the area, in which the non-zero transform coefficient is present in the transform block, from the subblock may be derived to be filled with zero (zero-out).

The encoding apparatus 100 may apply a primary transform including the horizontal transform and the vertical transform to the subblock and additionally apply a secondary transform.

In step S1940, the encoding apparatus 100 encodes information related to the transform. The information related to the transform includes a first flag (e.g., SBT horizontal flag) for a split direction of the current block and a second flag (e.g., SBT position flag) indicating the subblock to apply the transform from among the plurality of subblocks. The first flag (e.g., SBT horizontal flag) may indicate to split the current block into two transform units in the horizontal direction, or indicate to split the current block into two transform units in the vertical direction. In addition, the information related to the transform may include a flag (e.g., SBT flag) indicating whether the current block is split into the plurality of subblocks.

Figure 20:
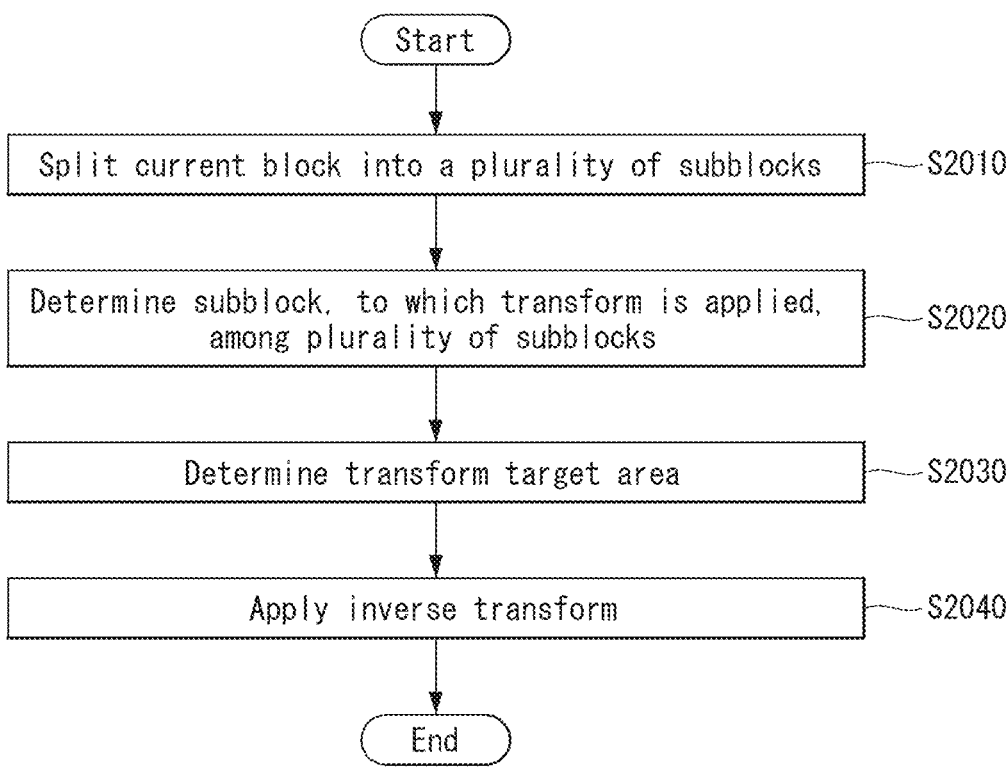
FIG. 20 illustrates an example of a flow chart for decoding a video signal according to an embodiment of the present disclosure.

FIG. 20 illustrates an example of a flow chart for decoding a video signal according to an embodiment of the present disclosure. In step S2010, the decoding apparatus 200 splits a current block into a plurality of subblocks based on a first flag (e.g., SBT horizontal flag) for a split direction of the current block.

The first flag (e.g., SBT horizontal flag) is a flag indicating the split direction of the current block (coding unit), and may indicate to split the current block into two transform units in a horizontal direction or indicate to split the current block into two transform units in a vertical direction.

In step S2020, the decoding apparatus 200 determines a subblock, to which a transform is applied, among the plurality of subblocks based on a second flag (e.g., SBT position flag) for a position of a transform target block. The second flag may indicate a subblock (i.e., subblock including CBF), to which the transform is applicable, among the split subblocks.

In step S2030, the decoding apparatus 200 determines a transform target area in the subblock, to which the transform is applied. The transform target area is determined based on a transform type applied to the subblock and a size of the subblock.

In an embodiment, a width nonZeroW of the transform target area may be determined based on a type trTypeHor of a horizontal transform and a width nTbW of the subblock, and a height nonZeroH of the transform target area may be determined based on a type trTypeVer of a vertical transform and a height nTbH of the subblock. For example, if the type trTypeHor of the horizontal transform corresponds to DST-7 or DCT-8 and the width nTbW of the subblock is greater than or equal to a first length (e.g., 32), the width nonZeroW of the transform target area may be determined as a second length (e.g., 16) less than the first length. Further, if the type trTypeVer of the vertical transform corresponds to DST-7 or DCT-8 and the height nTbH of the subblock is greater than or equal to the first length (e.g., 32), the height nonZeroH of the transform target area may be determined as the second length (e.g., 16) less than the first length. A remaining area excluding the transform target area from the subblock may be derived to be filled with zero (zero-out).

In step S2040, the decoding apparatus 200 applies an inverse transform including the horizontal transform and the vertical transform to transform coefficients of the transform target area.

Figure 21:
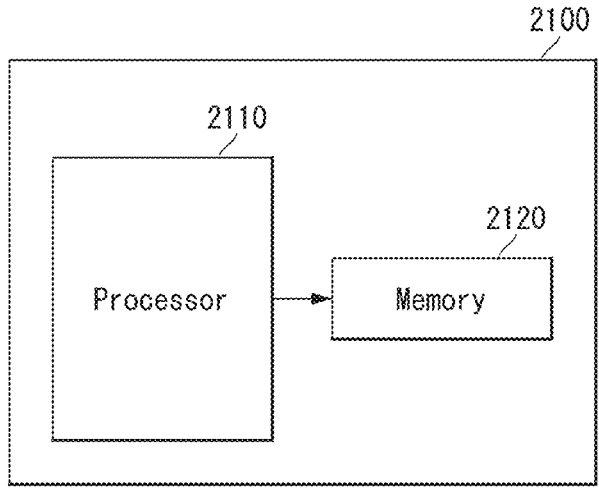
FIG. 21 illustrates an example of a block diagram of a device for processing a video signal, as an embodiment to which the present disclosure is applied.

FIG. 21 illustrates an example of a block diagram of a device for processing a video signal according to an embodiment of the present disclosure. A video signal processing device of FIG. 21 may correspond to the encoding apparatus 100 of FIG. 1 or the decoding apparatus 200 of FIG. 2.

A video signal processing device 2100 processing a video signal includes a memory 2120 storing the video signal and a processor 2110 processing the video signal while being coupled to the memory 2120.

The processor 2110 according to an embodiment of the present disclosure may consist of at least one processing circuit for processing the video signal and may process the video signal by executing commands for encoding or decoding the video signal. That is, the processor 2110 may encode original video data or decode encoded video signals by performing the encoding or decoding methods described above.

The processor according to an embodiment of the present disclosure, for the purpose of encoding the video signal, is configured to split a current block including residual samples into a plurality of subblocks, determine a subblock to apply a transform from among the plurality of subblocks, generate a transform block including transform coefficients by applying a horizontal transform and a vertical transform to the subblock, and encode information related to the transform, wherein an area in which a non-zero transform coefficient is present in the transform block is determined based on a transform type applied to the subblock and a size of the subblock, wherein the information related to the transform includes a first flag for a split direction of the current block and a second flag indicating the subblock to apply the transform from among the plurality of subblocks.

The processor according to an embodiment of the present disclosure, for the purpose of decoding the video signal, is configured to split a current block into a plurality of subblocks based on a first flag for a split direction of the current block, determine a subblock, to which a transform is applied, among the plurality of subblocks based on a second flag for a position of a transform target block, determine a transform target area in the subblock, and apply an inverse transform including a horizontal transform and a vertical transform to transform coefficients of the transform target area, wherein the transform target area is determined based on a transform type applied to the subblock and a size of the subblock.

In an embodiment, a width of the transform target area may be determined based on a type of the horizontal transform and a width of the subblock, and a height of the transform target area may be determined based on a type of the vertical transform and a height of the subblock.

In an embodiment, the type of the horizontal transform may correspond to DST-7 or DCT-8. If the width of the subblock is greater than or equal to a first length, the width of the transform target area may be determined as a second length less than the first length.

In an embodiment, the type of the vertical transform may correspond to DST-7 or DCT-8. If the height of the subblock is greater than or equal to the first length, the height of the transform target area may be determined as the second length less than the first length.

In an embodiment, a remaining area excluding the transform target area from the subblock may be derived to be filled with zero.

In an embodiment, the first flag may indicate to split the current block into two transform units in a horizontal direction, or indicate to split the current block into two transform units in a vertical direction.

The processing methods to which the present disclosure is applied may be manufactured in the form of a program executed by a computer and may be stored in computer-readable recording media. Multimedia data with a data structure according to the present disclosure may also be stored in computer-readable recording media. The computer-readable recording media include all types of storage devices and distributed storage devices in which data readable by a computer is stored. The computer-readable recording media may include a Blue-ray disk (BD), a universal serial bus (USB), a ROM, a PROM, an EEPROM, a RAM, a CD-ROM, a magnetic tape, a floppy disk, and an optical data storage device, for example. Furthermore, the computer-readable recording media includes media implemented in the form of carrier waves (e.g., transmission through the Internet). Furthermore, a bitstream generated by the encoding method may be stored in a computer-readable recording medium or may be transmitted over wired/wireless communication networks.

Embodiments of the present disclosure can be implemented as computer program products by program codes, and the program codes can be executed in a computer according to embodiments of the present disclosure. The program codes may be stored on computer-readable carriers.

A non-transitory computer-readable medium according to an embodiment of the present disclosure stores one or more commands executed by one or more processors. The one or more commands allow a decoding apparatus to split a current block into a plurality of subblocks based on a first flag for a split direction of the current block, determine a subblock, to which a transform is applied, among the plurality of subblocks based on a second flag for a position of a transform target block, determine a transform target area in the subblock, and apply an inverse transform including a horizontal transform and a vertical transform to transform coefficients of the transform target area. The transform target area is determined based on a transform type applied to the subblock and a size of the subblock.

The one or more commands allow an encoding apparatus to split a current block including residual samples into a plurality of subblocks, determine a subblock to apply a transform from among the plurality of subblocks, generate a transform block including transform coefficients by applying a horizontal transform and a vertical transform to the subblock, and encode information related to the transform. An area in which a non-zero transform coefficient is present in the transform block is determined based on a transform type applied to the subblock and a size of the subblock. The information related to the transform includes a first flag for a split direction of the current block and a second flag indicating the subblock to apply the transform from among the plurality of subblocks.

As described above, embodiments of the present disclosure can be implemented and executed on a processor, a microprocessor, a controller or a chip. For example, functional units shown in each figure can be implemented and executed on a computer, a processor, a microprocessor, a controller or a chip.

The decoder and the encoder to which the present disclosure is applied may be included in multimedia broadcast transmission/reception apparatuses, mobile communication terminals, home cinema video systems, digital cinema video systems, monitoring cameras, video conversation apparatuses, real-time communication apparatuses such as video communication, mobile streaming devices, storage media, camcorders, video-on-demand (VoD) service providing apparatuses, over the top video (OTT) video systems, Internet streaming service providing apparatuses, 3D video systems, video phone video systems, medical video systems, etc., and may be used to process video signals or data signals. For example, OTT video systems may include game consoles, Blue-ray players, Internet access TVs, home theater systems, smartphones, tablet PCs, digital video recorders (DVRs), etc.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although exemplary embodiments of the present disclosure have been described for illustrative purposes, those skilled in the art will appreciate that various modifications, additions and substitutions are possible, without departing from the technical spirit and the technical scope of the present disclosure.

US 12,652,416 B2

57

The invention claimed is:

1. A method for decoding a video signal, the method comprising:

obtaining a first flag for a split direction of the current block and a second flag for a position of a transform target block;

splitting a current block into a plurality of subblocks based on the first flag;

determining a subblock, to which a transform is applied, among the plurality of subblocks based on the second flag;

determining a transform target area in the subblock; and applying the transform including a horizontal transform and a vertical transform to transform coefficients of the transform target area, wherein a width of the transform target area is determined as a smaller value among a width of the subblock and 16, based on a kernel index of the horizontal transform being greater than zero, and determined as a smaller value among the width of the subblock and 32, based on the kernel index of the horizontal transform not being greater than zero, and wherein a height of the transform target area is determined as a smaller value among a height of the subblock and 16, based on a kernel index of the vertical transform being greater than zero, and determined as a smaller value among the height of the subblock and 32, based on the kernel index of the vertical transform not being greater than zero.

2. The method of claim 1, wherein a remaining area excluding the transform target area from the subblock is derived to be filled with zero.

3. The method of claim 1, wherein the first flag indicates to split the current block into two transform units in a horizontal direction, or indicates to split the current block into two transform units in a vertical direction.

4. A method for encoding a video signal, the method comprising:

splitting a current block into a plurality of subblocks based on a split direction;

generating a first flag for the split direction;

determining a subblock to apply a transform from among the plurality of subblocks;

generating a second flag for a position of the subblock to apply the transform;

generating a transform block including transform coefficients by applying a horizontal transform and a vertical transform to the subblock; and encoding information including the first flag and the second flag, wherein non-zero transform coefficients are present in an area of the transform block, wherein a width of the area is determined as a smaller value among a width of the subblock and 16, based on a kernel index of the horizontal transform being greater than zero, and determined as a smaller value among the width of the subblock and 32, based on the kernel index of the horizontal transform not being greater than zero, and wherein a height of the area is determined as a smaller value among a height of the subblock and 16, based on a kernel index of the vertical transform being greater than zero, and determined as a smaller value among the height of the subblock and 32, based on the kernel index of the vertical transform not being greater than zero.

5. The method of claim 4, wherein a remaining area excluding the area, in which the non-zero transform coefficient is present, from the subblock is derived to be filled with zero.

6. The method of claim 4, wherein the first flag indicates to split the current block into two transform units in a horizontal direction, or indicates to split the current block into two transform units in a vertical direction.

7. A non-transitory computer-readable medium storing a bitstream generated by a method, the method comprising:

splitting a current block into a plurality of subblocks based on a split direction;

generating a first flag for the split direction;

determining a subblock to apply a transform from among the plurality of subblocks;

generating a second flag for a position of the subblock to apply the transform;

generating a transform block including transform coefficients by applying a horizontal transform and a vertical transform to the subblock; and encoding information including the first flag and the second flag, wherein non-zero transform coefficients are present in an area of the transform block, wherein a width of the area, in which a non-zero transform coefficient is present, is determined as a smaller value among a width of the subblock and 16, based on a kernel index of the horizontal transform being greater than zero, and determined as a smaller value among the width of the subblock and 32, based on the kernel index of the horizontal transform not being greater than zero, and wherein a height of the area, in which a non-zero transform coefficient is present, is determined as a smaller value among a height of the subblock and 16, based on a kernel index of the vertical transform being greater than zero, and determined as a smaller value among the height of the subblock and 32, based on the kernel index of the vertical transform not being greater than zero.

* * * * *